(12) United States Patent
Duraj et al.

(10) Patent No.: US 9,500,765 B2
(45) Date of Patent: Nov. 22, 2016

(54) RADIATION DETECTION APPARATUS USING PULSE DISCRIMINATION AND A METHOD OF USING THE SAME

(71) Applicant: Saint-Gobain Ceramics & Plastics, Inc., Worcester, MA (US)

(72) Inventors: Artan Duraj, Seven Hills, OH (US); Peter R. Menge, Novelty, OH (US); Kan Yang, Solon, OH (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 14/075,756

(22) Filed: Nov. 8, 2013

(65) Prior Publication Data

US 2014/0131564 A1    May 15, 2014

Related U.S. Application Data

(60) Provisional application No. 61/724,747, filed on Nov. 9, 2012.

(51) Int. Cl.
*G01T 1/20*  (2006.01)
*G01V 5/06*  (2006.01)

(52) U.S. Cl.
CPC ...................... *G01V 5/06* (2013.01)

(58) Field of Classification Search
CPC ................. G01V 8/10; G01V 5/06
USPC ........................................ 250/362
See application file for complete search history.

(56) References Cited

U.S. PATENT DOCUMENTS

| 3,247,377 | A | * | 4/1966 | Hall, Jr. ............... G01T 3/06 |
| | | | | 250/265 |
| 5,023,450 | A | | 6/1991 | Gold |
| 5,083,124 | A | | 1/1992 | Nordstrom |
| 5,483,061 | A | | 1/1996 | Sloan |

(Continued)

FOREIGN PATENT DOCUMENTS

KR    10-2007-0103164 A    10/2007

OTHER PUBLICATIONS

Gerbier, G., et al. "Pulse Shape Discrimination and Dark Matter Search with NaI (TI) Scintillator at the Laboratoire Souterrain de Modane" Sources and Detection of Dark Matter and Dark Energy in the Universe, 2001, pp. 333-339.

(Continued)

*Primary Examiner* — David J Makiya
*Assistant Examiner* — Taeho Jo
(74) *Attorney, Agent, or Firm* — Robert N. Young; Abel Law Group, LLP

(57) ABSTRACT

A radiation detection apparatus can include a scintillator, a photosensor optically coupled to the scintillator, and a control module electrically coupled to the photosensor. The control module can be configured to receive a pulse from the photosensor and identify a cause of noise corresponding to the pulse. Such information can be useful in determining failure modes and potentially predict future failures of radiation detection apparatuses. In another embodiment, the wavelet discrimination can be used to determine whether or not the pulse corresponds to a scintillation pulse, and potentially to identify a type of radiation or a radiation source. The technique is robust to work over a variety of temperatures, and particularly, at temperatures significantly higher than room temperature.

19 Claims, 15 Drawing Sheets

(56) References Cited

U.S. PATENT DOCUMENTS

| | | | | |
|---|---|---|---|---|
| 5,744,803 A * | 4/1998 | Grodsinsky | G01T 1/20 | 250/254 |
| 5,748,471 A * | 5/1998 | Grande | G01H 15/00 | 702/6 |
| 6,087,656 A * | 7/2000 | Kimmich | G01T 1/40 | 250/252.1 |
| 6,397,679 B1 * | 6/2002 | Sadok | G01S 7/539 | 73/596 |
| 7,081,626 B2 * | 7/2006 | Ianakiev | G01T 1/20 | 250/362 |
| 7,120,562 B1 * | 10/2006 | Wilson | G06K 9/00523 | 361/115 |
| 8,173,954 B2 | 5/2012 | Duraj | | |
| 8,492,705 B2 * | 7/2013 | Menge | G01T 1/2018 | 250/262 |
| 8,682,102 B2 * | 3/2014 | Sugiura | G01V 1/48 | 340/853.1 |
| 8,700,359 B2 * | 4/2014 | Au | G01T 1/15 | 250/395 |
| 2004/0239923 A1 * | 12/2004 | Adams | G01J 3/28 | 356/317 |
| 2006/0025897 A1 * | 2/2006 | Shostak | B60C 23/005 | 701/1 |
| 2007/0219758 A1 * | 9/2007 | Bloomfield | G01V 11/002 | 702/190 |
| 2007/0284518 A1 | 12/2007 | Randall | | |
| 2008/0237475 A1 * | 10/2008 | Michaud | G01T 1/208 | 250/363.03 |
| 2009/0030614 A1 * | 1/2009 | Carnegie | G01V 1/48 | 702/6 |
| 2009/0114828 A1 * | 5/2009 | Decker | G01V 5/04 | 250/364 |
| 2009/0150077 A1 | 6/2009 | Stoller et al. | | |
| 2010/0090111 A1 * | 4/2010 | Stoller | G01T 1/20 | 250/337 |
| 2010/0163735 A1 | 7/2010 | Menge et al. | | |
| 2010/0176286 A1 * | 7/2010 | Duraj | G01V 5/04 | 250/262 |
| 2010/0231905 A1 | 9/2010 | Christian et al. | | |
| 2010/0305873 A1 * | 12/2010 | Sjoden | G01T 1/362 | 702/30 |
| 2011/0095173 A1 * | 4/2011 | Menge | G01T 1/2018 | 250/262 |
| 2012/0043458 A1 * | 2/2012 | Herr | G01T 1/20 | 250/239 |
| 2012/0126127 A1 * | 5/2012 | Duraj | G01T 3/06 | 250/369 |
| 2012/0197831 A1 * | 8/2012 | Dong | A61B 5/0452 | 706/20 |
| 2012/0200421 A1 | 8/2012 | Duraj | | |
| 2012/0312994 A1 * | 12/2012 | Nikitin | G01T 1/2002 | 250/362 |
| 2013/0168556 A1 * | 7/2013 | Blackburn | G01T 1/20 | 250/362 |

OTHER PUBLICATIONS

Yousefi, Siavash, "An Abstract of the Thesis of Siavash Yousefi: Digital Pulse Shape Discrimination Methods for Triple-Layer Phoswich Detector Using Wavelets and Fuzzy Logic", May 29, 2008, 132 pgs.

International Search Report for PCT/US2013/069269 dated Feb. 12, 2014, 4 pgs.

* cited by examiner

RADIATION DETECTION APPARATUS USING PULSE DISCRIMINATION AND A METHOD OF USING THE SAME

CROSS-REFERENCE TO RELATED APPLICATION

This application claims priority under 35 U.S.C. §119(e) to U.S. Patent Application No. 61/724,747 entitled "Radiation Detection Apparatus Using Pulse Discrimination and a Method of Using the Same," by Yang et al., filed Nov. 9, 2012, which is incorporated herein by reference in its entirety.

BACKGROUND

Field of the Disclosure

The following is directed to radiation detection apparatuses, and more particularly to radiation detection apparatuses using pulse discrimination and methods of using the same.

Description of the Related Art

Spectral gamma ray measurements play a major role in oil and gas logging operations by providing a way to interpret the porosity-lithology and naturally occurring radioactive materials in the surrounding rock strata. Certain properties of rock formations can be directly correlated to the oil or gas production performance of the strata within a field. For example, the amount of naturally occurring radioactive material can be correlated to conditions that are indicative of hydrocarbon producing formations.

However, the detection of gamma rays requires sensitive materials and complex electronics. In particular, the electronic components are often highly application-specific components that analyze the spectral information to ascertain certain properties of the surrounding rock strata. Additionally, the sensitive materials and complex electronics are subject to harsh environmental conditions, including mechanical shocks and vibrations and broad temperatures ranges, from −60° C. to room temperature to elevated temperatures that may be in excess of 150° C. The industry continues to need improved radiation detection apparatuses capable of reliable service and stable analysis over a wide range of temperatures.

BRIEF DESCRIPTION OF THE DRAWINGS

Embodiments are illustrated by way of example and are not limited by the accompanying figures.

Figure 1:
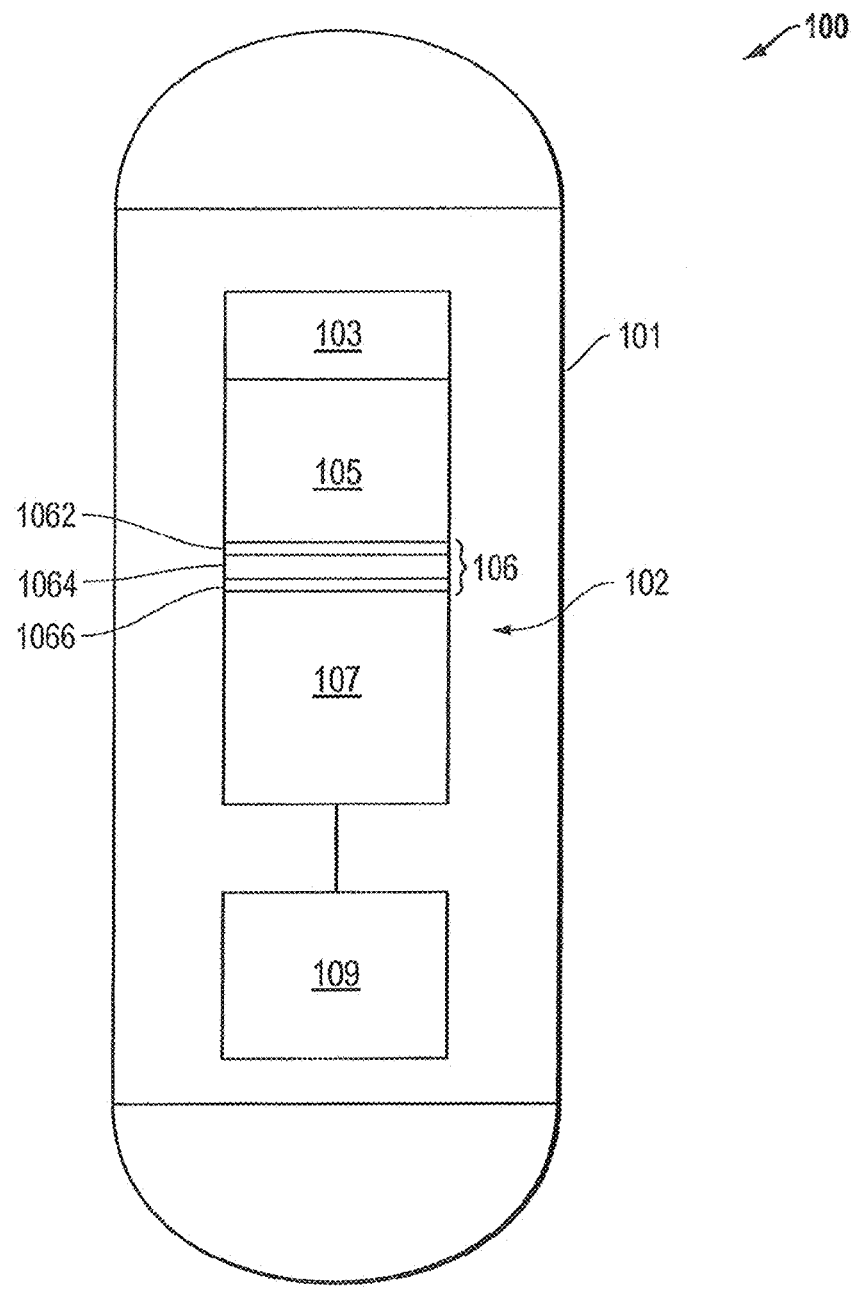
FIG. 1 includes a schematic depiction of a sonde including a radiation detection apparatus in accordance with an embodiment.

Skilled artisans appreciate that elements in the figures are illustrated for simplicity and clarity and have not necessarily been drawn to scale. For example, the dimensions of some of the elements in the figures may be exaggerated relative to other elements to help improve understanding of embodiments of the invention. The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

The term "high fidelity amplifier" is intended to mean a device that amplifies or deamplifies an input signal to produce an output signal, wherein the output signal has substantially all of the information contained within the input signal or substantially all of such information of the input signal can be derived from the output signal. A high fidelity amplifier does not include an integrating pre-amplifier or a shaping amplifier.

The term "rare earth" or "rare earth element" is intended to mean Y, Sc, and the Lanthanides (La to Lu) in the Periodic Table of the Elements.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

FIG. 1 includes a schematic depiction of a sonde 100 including a radiation detection apparatus 102 in accordance with an embodiment. The sonde 100 is a probe that can include a variety of devices that can be used in exploring regions and environments unsuitable for humans. One such application is exploratory drilling or well-logging applications in which holes can be drilled within the crust of the earth in order to explore and characterize rock structures below the surface. The sonde 100 may be a standalone tool or may be incorporated with other equipment near the distal end of a drill string. The other equipment can include a drill bit at the tip of the distal end, a turbine coupled to the drill bit, a generator or alternator coupled to the turbine, a battery or other energy storage device, a variety of sensors, such as rotational speed sensors, positional sensors, pressure sensors, and the like. The drill string includes sections of pipe that are screwed together and are manipulated at the proximal end of the drill string, which is at the surface. For example, the entire drill string can be rotated during drilling Mud pumps outside the well bore pump mud along the drill string. The mud serves multiple purposes, one of which is to cause the rotor of the downhole turbine to spin. During drilling, many different parts of the drill string can be in motion. For example, the entire drill string may be rotating while mud is being pumped along the drill string which in turn causes the turbine to operate, which in turn causes the drill bit to rotate. The drilling can expose the radiation detection apparatus to be exposed to vibration or another noise that is generated near the radiation detection apparatus or is transmitted along any portion of the drill string, including from sources outside the drill string, such as the mud pumps. The significance of the noise is addressed later in this specification.

As illustrated, the sonde 100 can include a housing 101 for encapsulating and enclosing the radiation detection apparatus 102, can be part of a measurement-while-drilling ("MWD") device. The housing 101 can be made of a material suitable for withstanding harsh environments including large temperature shifts from ambient conditions to temperatures in excess of 150° C., in excess of 200° C. or higher. The housing is sealed against pressures as high as 70 MPa (10,000 pounds per square inch). Additionally, the housing 101 may be capable of withstanding severe mechanical stresses and vibrations. As such, the housing 101 can be made of a metal or metal alloy material. Often, the housing 101 can be sealed to protect sensitive components inside from liquids, such as water, encountered in well-logging applications.

The radiation detection apparatus 102 can include materials and components suitable for detecting certain types of radiation in order to facilitate analyzing and characterizing rock structures surrounding the sonde 100, including properties such as the presence of hydrocarbon materials, presence of water, density of the rock, porosity of the geological formations, and the like. In a particular embodiment, the radiation detection apparatus 102 includes a calibration source 103, a scintillator 105, an optical coupling member 106, a photosensor 107, and a control module 109. The calibration source 103 can be coupled to the scintillator 105, and the scintillator 105 can be optically coupled to the photosensor 107, and the control module 109 can be unidirectionally or bidirectionally coupled to the photosensor 107. In another particular embodiment, the calibration source 103 may be a standalone unit and may be transported to different locations to calibrate different radiation detection apparatuses. Depending on the calibration source 103, the control module 109 may or may not be coupled to the calibration source 103.

In an embodiment, the calibration source 103 can be a component capable of emitting radiation at a known wavelength or spectrum of wavelengths suitable to cause the scintillator 105 to emit scintillating light. In another embodiment, the calibration source can also be capable of emitting neutrons or charged particles, such as alpha particles. In a particular embodiment the calibration source includes a light emitting diode ("LED") or laser diode ("LD"). Some suitable LEDs include those that emit light within the ultraviolet portion of the spectrum. When the calibration source 103 includes an electronic device, the calibration source 103 may be coupled to the control module 109. In an alternative embodiment, the calibration source may be controlled at the surface. In another embodiment, the calibration source 103 is a radioactive isotope. In one particular embodiment, the calibration source 103 includes radioactive isotopes, such as cobalt 60, ($^{60}$Co), americium 241 ($^{241}$Am), cesium 137 ($^{137}$Cs), or an isotope of another Lanthanide element. The wavelength of radiation emitted by the calibration source 103 may be such that it is detectable by the scintillator 105 and not the photosensor 107. For example, the photosensor 107 may not be significantly sensitive to the particular wavelength or spectrum of wavelengths of radiation emitted by the calibration source 103. In this manner, scintillating light from the scintillator 105, and not radiation from the calibration source 103, is sensed by the photosensor 107.

The scintillator 105 can be a material that responds to radiation by emitting scintillating light at a known wavelength or spectrum of wavelengths depending on the type of radiation captured by the scintillator 105. In accordance with an embodiment, the scintillator 105 can be made of a crystalline material, a liquid material, a gel, or another suitable scintillator material. The scintillator 105 can include an inorganic or organic material. Depending on the material, the scintillator 105 can be sensitive to different types of radiation. In an embodiment, the scintillator 105 is an inorganic crystalline or ceramic scintillator and includes a halogen-containing material, an oxide, a sulfide, or any combination thereof. The inorganic scintillator material may contain an alkali or rare earth element. A scintillator material suitable to emit scintillating light in response to capturing gamma rays includes activated lanthanum bromide, activated lanthanum chloride, activated sodium iodide, activated cesium iodide, activated strontium iodide, or activated bismuth germinate. A particular activating species can include cerium, thallium, sodium, scandium, praseodymium, europium, terbium, ytterbium, or neodymium. In a particular embodiment, the scintillator is thallium-activated sodium iodide or a rare earth halide, such as LaBr$_3$:Ce. In another embodiment, the scintillator 105 is an elpasolite, such as Cs$_2$LiYCl$_6$:Ce. A liquid scintillator material capable of emitting scintillating light at a temperature in excess of 150° C. may be used. In other embodiment, the scintillator 105 includes an organic material, such as anthracene or stilbene. An organic scintillator material can include a polymer, such as a polyvinyl toluene, a polystyrene, an acrylic, and anther suitable organic scintillator material or any combination thereof.

The optical coupling material 106 can include a window 1064, a scintillator pad 1062 between the scintillator 105 and the window 1064, and a photosensor pad 1066 between the window 1064 and the photosensor 107. The window 1064 can be ultraviolet transparent or translucent. In a particular embodiment, the window 1064 includes a glass, a sapphire, an aluminum oxynitride, or the like. Each of the scintillator pad 1062 and the photosensor pad 1066 can include a pad material, such as a silicone rubber or a clear epoxy. In a particular embodiment, the scintillator pad 1062, the photosensor pad 1066, or both can filter ultraviolet that may be useful in determining where a spark occurred within the radiation detection apparatus 102. More details about ultraviolet light filtering by the pads 1062 and 1066 are addressed later in this specification.

The photosensor 107 can generate an electronic pulse in response to receiving scintillating light from the scintillator 105 or in response to noise. The photosensor 107 can be a photomultiplier tube ("PMT"), a semiconductor-based photomultiplier, or another suitable device that generates an electronic pulse in response to the scintillating light. The electronic pulse from the photosensor 107 can be transmitted to the control module 109.

The control module 109 can receive and process an electronic pulse from the photosensor 107 to enable a user to evaluate information gathered by the radiation detection apparatus 102. The control module 109 may include an amplifier, an analog-to-digital converter, a processor, a memory, another suitable component, or any combination thereof. In an embodiment, the amplifier can be a high fidelity amplifier in order to reduce the likelihood of losing information within a pulse as generated by the photosensor 107. In another embodiment, a pulse generated by the photosensor may not be amplified, and thus, the pulse as generated by the photosensor 109 may be directly received by the analog-to-digital converter or the control module, so that the received pulse is substantially the same as the pulse when it was originated.

The control module 109 can also include electronic components that can send control signals to the calibration source 103 when the calibration source 103 includes an electronic component. The control module 109 may be able to receive state information associated with the radiation detection apparatus 102. Thus, the state information can include state information of the radiation detection apparatus 102. When the radiation detection apparatus 102 is coupled to other equipment (for example, well drilling equipment), the state information may include state information of such other equipment. In an embodiment, the state information can include temperature or pressure of the sonde 100 or a location adjacent to sonde 100, operational parameters, such are turbine speed, drill bit speed, rotational speed of the drill string, or other suitable information. More details regarding the operation of the control module 109 with respect to processing electronic pulses from the photosensor 107 are described in more detail later in this specification. While the control module 109 can be contained within the sonde 101, the control module 109 may be located at the surface. When the control module 109 is within the sonde 101, the control module 109 may be powered by a downhole generator, alternator, or local energy storage device, such as a battery.

The radiation detection apparatus 102 can be used within the well bore to allow MWD or Wireline information to be obtained. U.S. Pat. No. 8,173,954, which is incorporated in its entirety, addresses operation of a radiation detection apparatus similar to that previously described. The radiation detection apparatus 102 in accordance with concepts as described herein is configured to provide further functionality not explicitly disclosed in U.S. Pat. No. 8,173,954.

The radiation detection apparatus 102 may be used in well-logging applications and, as such, the radiation detection apparatus 102 may be exposed to harsh conditions, such as high temperature and one or more other conditions (for example, vibration or another noise source) that may cause noise that is reflected in the electronic pulse from the photosensor 107. The noise may come from sources inside or outside the radiation detection apparatus 102. For a drilling operation, noise may come from mud pumps, the drill string of which the sonde 100 is a part being rotated, the drill bit as it hits rock or other underground formations, electromechanical interference from the photodetector 107, and potentially other sources. Some noises occur at constant rate and can be filtered using a conventional technique.

Other noise can occur randomly (that is, not at a constant rate) and produce a signal at a frequency that may or may not be close to the frequency of scintillation pulse produced in response to capturing targeted radiation (herein referred to as a "scintillation pulse"). Such other noise can produce a noise pulse as generated by the photosensor 107 that can be difficult to distinguish from a scintillation pulse. For example, vibration can cause components within the radiation detector apparatus 102 to move and build up electrostatic charge. When the accumulated charge becomes sufficiently large, a spark may occur and lessen the accumulated charge. The spark may result in a noise pulse to be generated at the photosensor 107. The next spark may occur relatively shortly after the prior spark, relatively longer in time after the prior spark, or no further spark may occur. Hence, the spark is a random event. In another embodiment, the sonde 100 may experience a sudden mechanical shock that could move a dynode within the photosensor or may adversely affect an electrical connection resulting in an intermittent electrical short or electrical open. In this specification, a sudden mechanical shock is a particular type of vibration. The adverse effects from the mechanical shock may manifest themselves under only under particular operating conditions, which may or may not be known to the operator. The adverse effects may or may not occur at a constant rate. The adverse effects that do not repeat at a constant rate can be deemed as random events, in a manner similar to the spark. After reading this specification, skilled artisans will appreciate that other operating conditions can result in noise pulses generated in the photosensor 107, which such noise pulses occur randomly.

Further, the amount of noise reflected in the photosensor 107 can vary as a function of temperature. To improve the accuracy of the radiation detection system 102, the control module can be configured to use state information associated with the radiation detection apparatus to identify more accurately noise, as opposed to scintillating light. The state information may include temperature, pressure, operational mode or conditions of the radiation detection apparatus 109 or other equipment, other suitable data, or the like. For example, the state information may include the temperature as measured by a sensor adjacent to the photosensor 107. As a particular non-limiting example, an electronic pulse for a noise source at room temperature (for example, approximately 25° C.) may be different than an electronic pulse for the same noise source at a higher temperature, for example 200° C.

In some applications, such as well-logging applications, the sonde 100 and radiation detection apparatus 102 may be subject to high temperatures. The intensity of radiation received by the scintillator 105 from calibration source 103 or from the surrounding environment, such as a strata formation is typically not significantly affected by such high temperatures. However, such high temperatures can have an adverse effect on the radiation detection apparatus output, and more particularly, the scintillating light output of the scintillator 105, the electronic pulse output from the photosensor 107 due to vibration or another noise source, or a combination of effects of the light output and electronic pulse. With respect to the scintillating light, depending upon the scintillator material of the scintillator 105, the loss in terms of scintillating light output may be approximately 0.3% per 1° C. increase when the temperature is in a range of 25° C. to 150° C., while losses for the photosensor 107 just for the reduction in scintillating light output may be approximately 0.4% per 1° C. increase when the temperature is within such temperature range.

Figure 2:
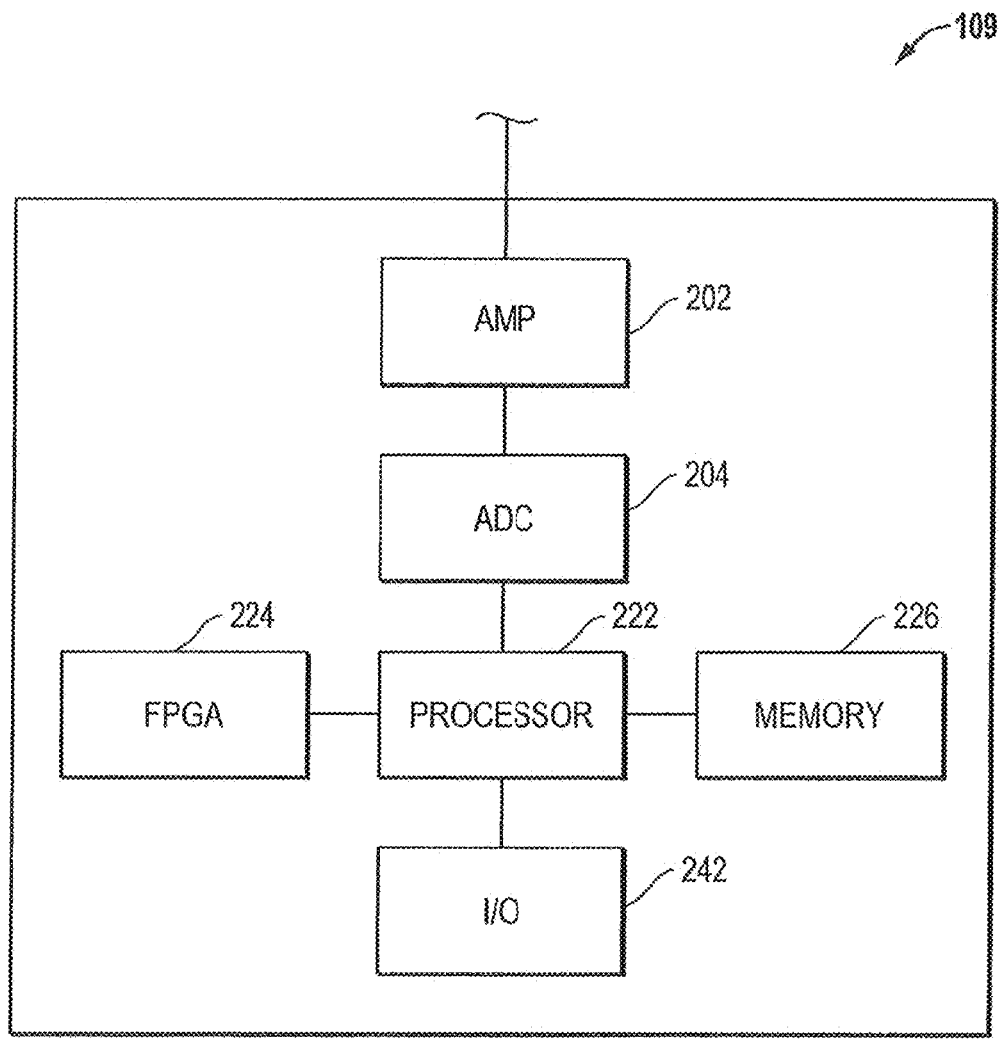
FIG. 2 includes a schematic view of a portion of a control module in accordance with an embodiment.

FIG. 2 includes a schematic diagram of an illustrative, non-limiting embodiment of the control module 109. As illustrated, an amplifier 202 is coupled to an analog-to-digital converter 204, which is coupled to a processor 222. In an embodiment, the amplifier 202 can be a high fidelity amplifier. The processor 222 is coupled to a programmable/re-programmable processing module ("PRPM"), such as a field programmable gate array ("FPGA") 224 or application-specific integrated circuit ("ASIC"), a memory 226, and an input/output ("I/O") module 242. The couplings may be unidirectional or bidirectional. The functions provided by the components are discussed in more detail below. In another embodiment, more, fewer, or different components can be used in the control module 109. For example, functions provided by the FPGA 224 may be performed by the processor 222, and thus, the FPGA 224 is not required. The FPGA 224 can act on information faster than the processor 222.

Before the FPGA 224 is used in well logging or another application, information regarding light output from the scintillator 105 when the scintillator is at different temperatures and from noise sources when the photosensor 107 is at different temperatures is programmed into the FPGA 224. Such information may be obtained by subjecting the scintillator 105, the photosensor 107, or the radiation detection apparatus 102 to environmental conditions to which the scintillator 105, the photosensor 107, or the radiation detection apparatus 102 will be exposed. The information can includes noise pulses that correspond to the random events as previously described. For example, the radiation detection apparatus 102 may be subjected to vibration when operating or when contacting rock when drilling that can result in a spark within the radiation detection apparatus 102, and a corresponding pulse generated by the photosensor 107 can be generated when the radiation detection apparatus is at a temperature in a range of 100° C. to 250° C. Additional information may be obtained when the radiation detection apparatus 102 is exposed to radiation when exposed to a plurality of temperatures in a range of 100° C. to 250° C. Both the light output of the scintillator 105 and the electronic pulse corresponding to the vibration can be affected by temperature. Further information within the FPGA 224 can also include pulse shape discrimination information to help to characterize scintillating pulses to determine the type or source of radiation captured by the scintillator 105, if needed or desired.

During operation, an electronic pulse from the photosensor 107 can be received at the control module 109, the electronic pulse can be amplified by the amplifier 202, and the amplified electronic pulse can be converted to a digital pulse by the analog-to-digital converter 204. The digital pulse can be received by the processor 222. The digital pulse can be processed by the processor 222, sent from the processor 222 to the FPGA 224, to the memory 226, or to the I/O module 242. Although not illustrated, the processor 222 can receive state information from a sensor or another device within the radiation detection apparatus or outside of the radiation detection apparatus. The state information may be stored in the memory 226. When the digital pulse is received by the processor 222, the processor 222 can request the latest state information from the memory 226 or from one or more sensors or other devices, if the processor 222 does not already have such state information. The digital pulse and state information can be sent from the processor 222 to the FPGA 224.

The FPGA 224 can use the digital pulse, and optionally, state information, and determine whether the digital pulse corresponds to a scintillation pulse or noise pulse. Further, when a noise pulse, the cause of the noise that resulted in the noise pulse. The determination of the pulse can be performed using information derived from the pulse. The derivative information from the pulse can be used to determine whether the pulse is a scintillation pules or a noise pulse, identify a type of radiation or a radiation source corresponding to the pulse, identify a source of noise corresponding to the pulse, or any combination thereof. In an embodiment, the derivative information includes a transform-based parameter, and the transform can be a wavelet transform, a Fast Fourier Transform ("FFT"), Discrete Cosine Transform ("DCT"), or another suitable transform. In another embodiment, the derivative information can include a rise time, a slope of intensity vs. time during rise, area under the curve during rise as measured as an integration of intensity over a time period, a decay time, a slope of intensity vs. time during decay, area under the curve during decay as measured as an integration of intensity over a time period, a ratio of the rise time to the decay time, or any derivative thereof. An example of such a derivative can include the area under the curve during rise to the area under the curve during the decay, or the like.

In a particular embodiment, wavelet discrimination can be used and is described in more detail below. In other embodiments, other transforms may be used. Some transforms may work better for a particular scintillator composition and particular causes of noise at a particular temperature or range of temperatures or other operating conditions, and other transforms may work better for a different scintillator composition, different causes of noise, different temperature or range of temperatures or other operating conditions. Thus, wavelet discrimination may work for better for a particular set of parameters, and discrimination based on Fast Fourier Transforms or another transform may work better for another set of parameters. After reading this specification, skilled artisans will be able to select a type of transform that works sufficiently well for their particular application and be able to extend the teachings as described herein to use transformed parameters to classify a pulse as a noise pulse or a scintillation pulse and to identify a cause of the noise or a type of radiation or a radiation source.

With respect to wavelet discrimination, wavelets are functions that satisfy certain mathematical requirements and are used in representing data or other functions. In wavelet discrimination, an analysis is based on a basis wavelet function, also called a mother wavelet. The pulse is then represented as a linear combination of a series of the mother wavelet functions. This is also referred to as a wavelet transform. In an embodiment, the mother wavelet is a Morlet wavelet. In another embodiment, a Haar wavelet, a Meyer wavelet, a Mexican hat wavelet, a Daubechies wavelet, a Coiflet wavelet, a Symlet wavelet, a Paul wavelet, a Difference of Gaussians wavelet, a customized wavelet, or another suitable wavelet may be used.

Each mother wavelet can be characterized by three coefficients:
1) s: Scale factor (This defines the width of the wavelet);
2) t: Location (This defines the location of the wavelet; in a particular embodiment, position is time, t.); and
3) a: Amplitude.

After wavelet transformation, a signal (for example, a digitized scintillation pulse, x-y pairs of amplitude and time) can be represented as a series of s, t and a coefficients. Thus, suitable pulse shape discrimination ("PSD") parameters can be generated from the pulse, wherein the PSD parameters are based on the wavelet coefficients. A benefit of wavelet discrimination is that it is especially good for fast (sharp) pulses, as it gives good separation. Further, it is substantially insensitive to stochastic noise. Further, it is substantially insensitive to a false signal caused by signal reflection or discontinuities in the cable. Still further, it is substantially insensitive to a false signal caused by electromagnetic interference from nearby electronics or other electromagnetic signal source.

A non-limiting embodiment of wavelet discrimination is provided to illustrate how wavelet discrimination can be used in analyzing a pulse from the photosensor 107. In this embodiment, an electronic pulse has been converted to a digital pulse, and the mother wavelet is a Morlet wavelet. The output for wavelet transform is a matrix that contains series of s, t, and a values. Because a is a complex number (due to phase difference among basis wavelets), a power of a is used to represent the absolute magnitude of that basis wavelet. The coefficient t is used as the x axis, the coefficient s is used as the y axis, and $|a|^2$ is used as the z-axis. Thus, a power spectrum of a wavelet transform of signal can be plotted.

Figure 3:
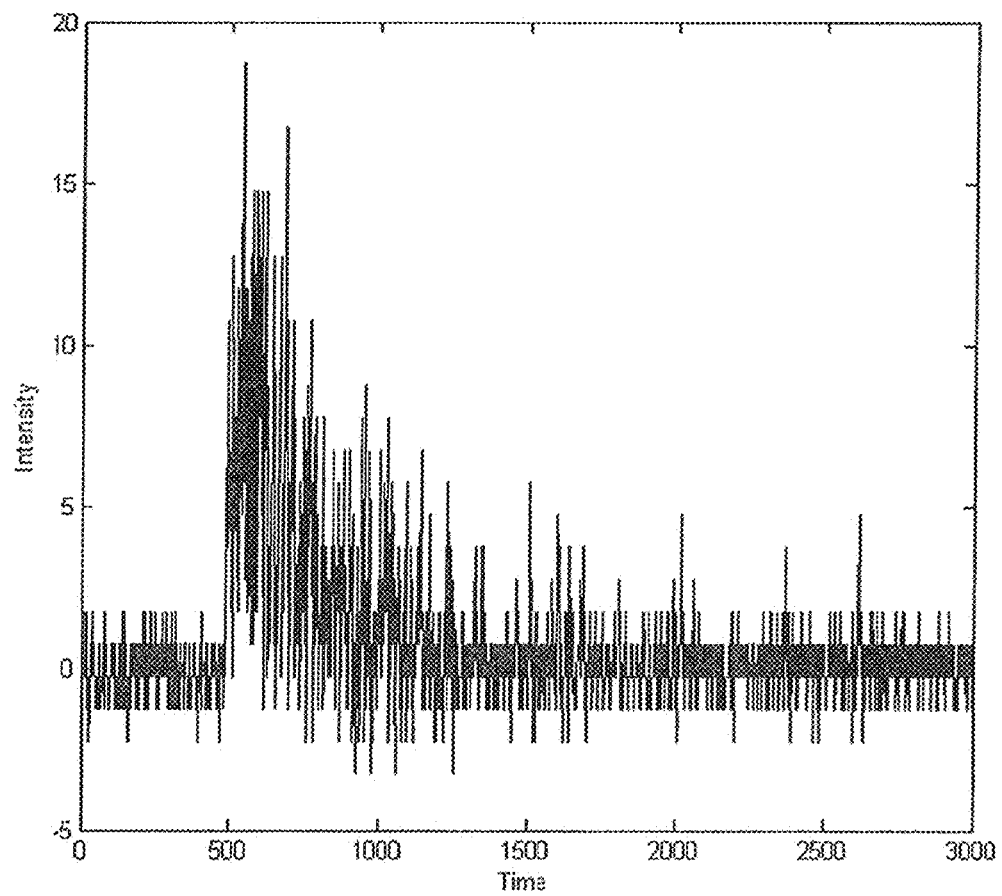
FIG. 3 includes an intensity vs. time plot of a scintillation pulse as generated by a photosensor.
Figure 4:
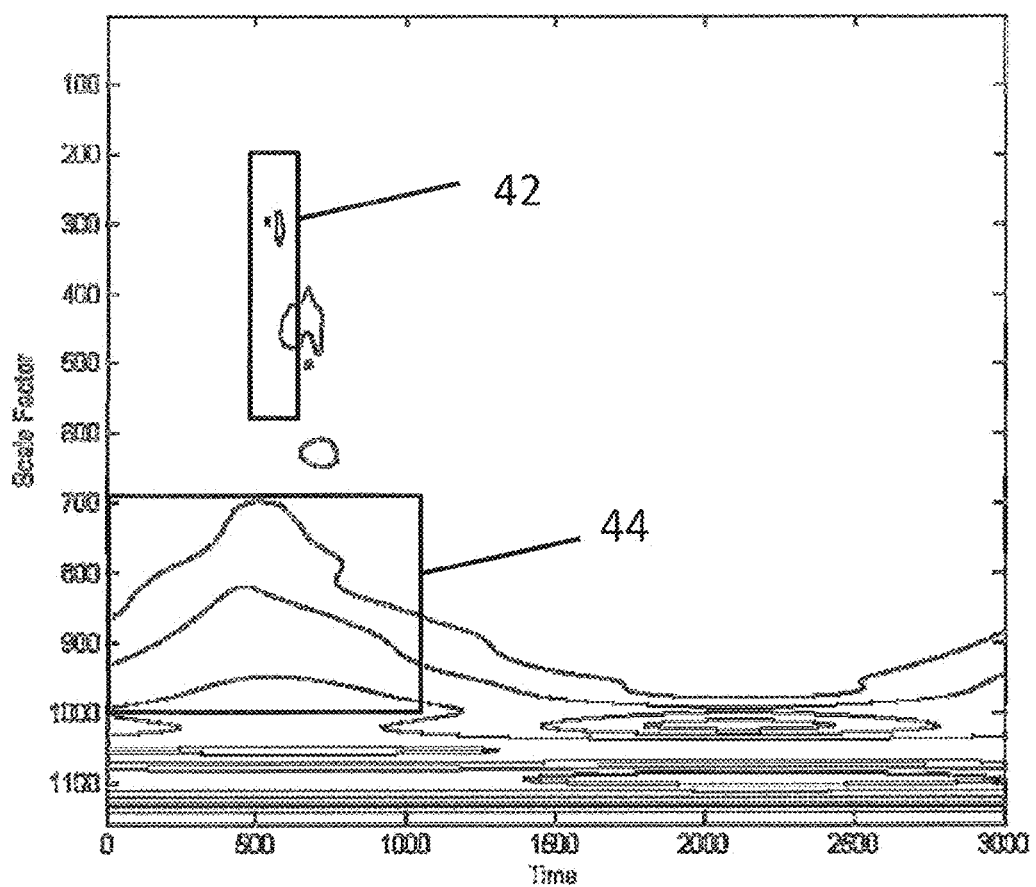
FIG. 4 includes a Scale factor s vs. Time t plot corresponding to the scintillation pulse of FIG. 3.

Radiation can be captured by the scintillator 105 that emits a light pulse in response to capturing the radiation, and the photosensor 107 can generate a scintillation pulse. The scintillation pulse can be plotted as illustrated in FIG. 3. A wavelet transformed pulse can be generated from the scintillation pulse. FIG. 4 includes an illustration of the wavelet transformed scintillation pulse, represented in a Time t vs. Scale factor s plot. The illustration includes windows 42 and 44. In FIGS. 3 and 4, high scale values correspond to global information of a signal (that is, a signal that spans all or most of the time window, otherwise known as "dilated" signal). Low scale values correspond to detailed information in the signal that lasts a relatively short time (that is, a "compressed" signal). Thus, on the time scale of a pulse, plotted values that are high in scale axis values correspond to scintillation pulses. Plotted values that are low in scale axis values correspond to noise. Furthermore, since noise pulses are short in time duration compared to the scintillation pulses, their transforms can be limited in range on the time axis. They will only appear to span a narrow time range. Transformed scintillation pulses will appear over a relatively wider time range. Therefore, by enclosing certain regions of the transformed parameter space, such as the windows 42 and 44 a pulse can be classified as a noise pulse or a scintillation pulse. Transformed noise will appear low in scale values and have a narrow range in time values, such as illustrated with window 42. Transformed scintillation signals will appear high in scale values and have a wide range in time values, such as illustrated with window 44.

Figure 5:
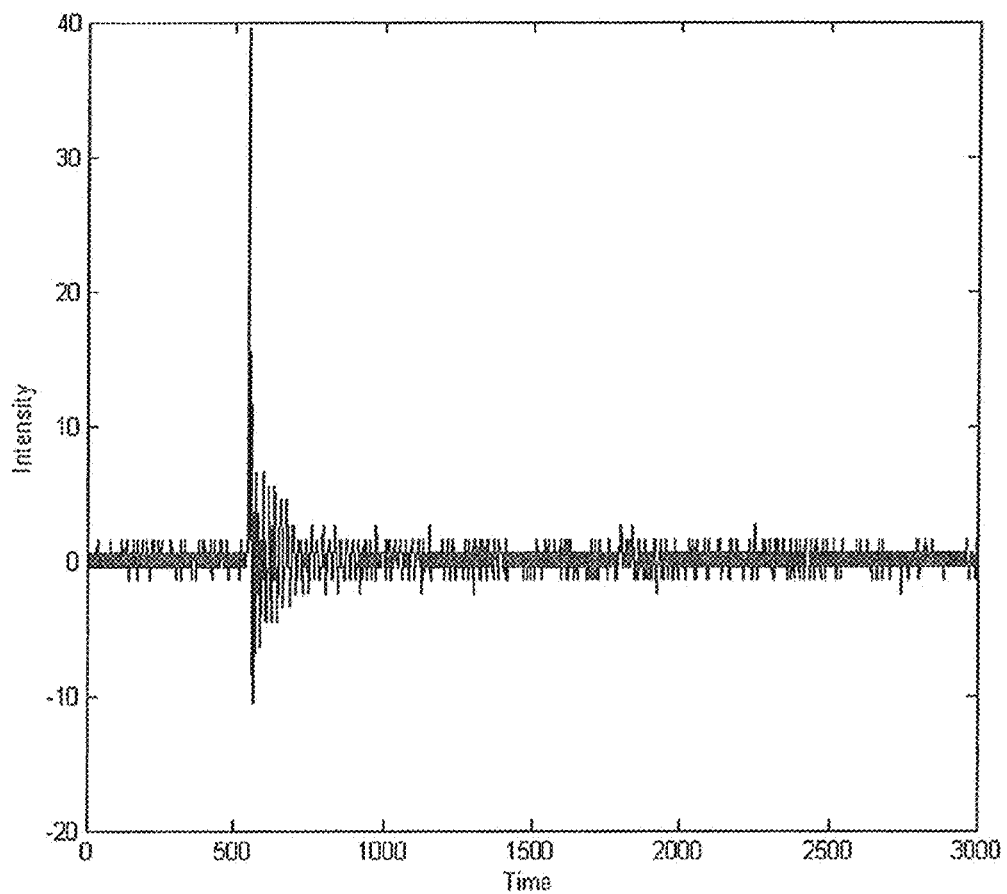
FIG. 5 includes an intensity vs. time plot of a noise pulse as generated by a photosensor.
Figure 6:
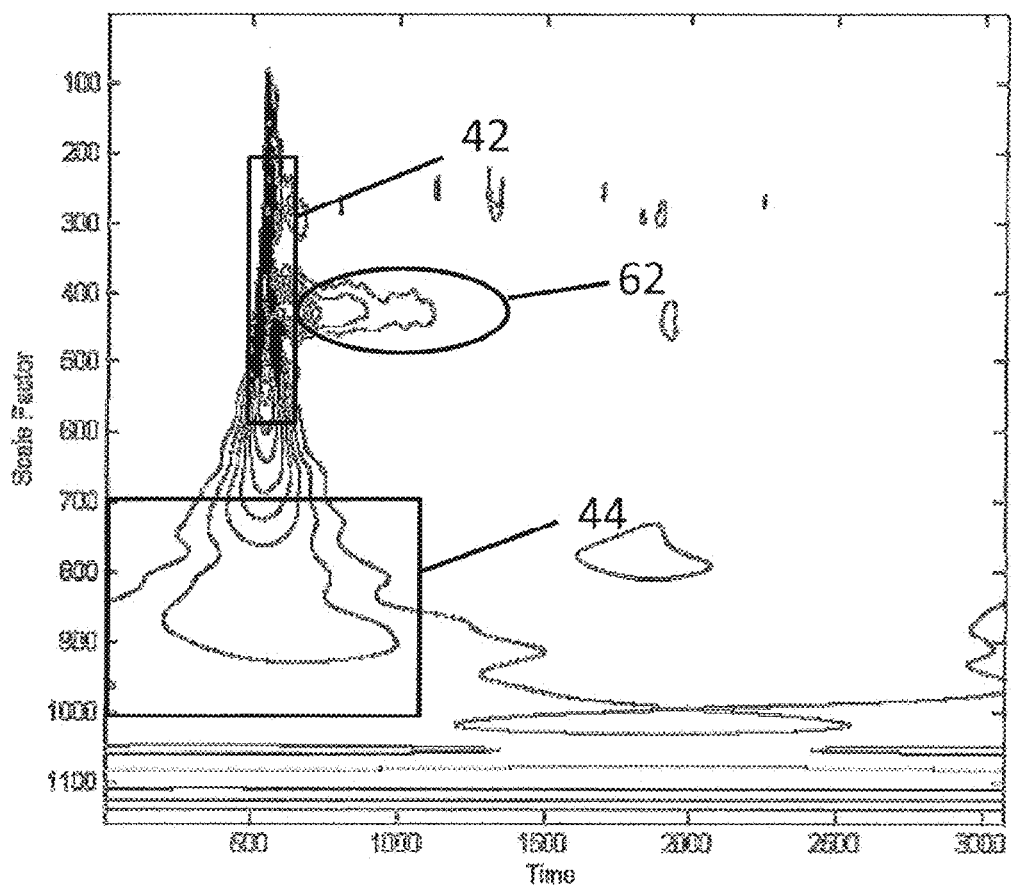
FIG. 6 includes a Scale factor s vs. Time t plot corresponding to the noise pulse of FIG. 5.

Vibration-induced pulses can also be generated by the photosensor 107. In an embodiment, signal oscillation may be caused by cable reflection. FIG. 5 includes an illustration of the noise pulse as generated by the photosensor 107, wherein the noise pulse corresponds to the cable reflection. A wavelet transform of the pulse can be generated from the noise pulse. FIG. 6 includes an illustration of the wavelet transformed noise pulse, represented in a Time t vs. Scale factor s plot. The portion of the wavelet transformed noise pulse within an oval 62 corresponds to the cable reflection. Such information can be retained in a log or other record used to monitor the health of the radiation detection apparatus 102, and such information may be included with or excluded from further analysis if needed or desired.

Further, a Wavelet PSD Parameter may be calculated based on the s, t, and a coefficients from the wavelet transform. In an illustrative, non-limiting embodiment, the Wavelet PSD Parameter is calculated using the equations below $$\text{Wavelet PSD parameter} = \frac{Integration_1}{Integration_2},$$

wherein $Integration_1$ is:

$$Integration_1 = \int_{t1\ lower}^{t1\ upper} \int_{s1\ lower}^{s1\ upper} |a|^2 ds dt;$$
and wherein $Integration_2$ is:

$$Integration_2 = \int_{t2\ lower}^{t2\ upper} \int_{s2\ lower}^{s2\ upper} |a|^2 ds dt$$

In a particular, the values used for the integration may be, for $Integration_1$: s1 upper is 650, s1 lower is 200, t1 upper is 575, and t1 lower is 525; and, for $Integration_2$, s2 upper is 1000, s2 lower is 700, t2 upper is 1100, and t2 lower is 1. For a pulse generated by the photosensor 107, the Wavelet PSD Parameter and other information can be used to determine whether or not the pulse is a scintillation pulse or whether or not the pulse is a noise pulse. Examples that are described later in this specification illustrate a non-limiting embodiment to identify a potential source for a pulse.

Wavelet discrimination can be particularly useful when the pulse is affected by environmental conditions. In particular, state information can be used to help determine whether a pulse is a scintillation pulse or a noise pulse, and potentially to identify a type of radiation or radiation source or a cause of the noise. In a non-limiting embodiment, the pulse generated at a particular temperature within the radiation detection apparatus 102 can be compared to stored digital pulses for the same or similar temperature. The FPGA 224 can identify which of the stored digital pulses is closest to the digital pulse recently received from the processor 222. The FPGA 224 can send information to processor 222 whether the digital pulse corresponds to a scintillating pulse or a noise pulse.

If the digital pulse is a scintillation pulse, the FPGA 224 may identify a possible type of radiation (gamma radiation, x-rays, neutrons, or the like) or a radiation source corresponding to the scintillating pulse. If the digital pulse corresponds to a noise pulse, the digital pulse may be further analyzed to identify a possible cause of the noise pulse. The processor 222 may store the digital pulse, information from FPGA 224, or a combination thereof into the memory 226 or may pass the digital pulse, state information, other information (for example, cause of the noise pulse), or any combination thereof from FPGA 224 to the processor 222, which may in turn store the digital pulse, state information, other information, or any combination in the memory 226, send the digital pulse, state information, other information, or any combination to the I/O module 228 for transmission outside the radiation detection apparatus 102, or perform any combination thereof. In an embodiment, some information may be stored and other information transmitted, and in another embodiment all of such information received from the FPGA 224 may be stored and transmitted. Other embodiments may be used and not deviate from the scope of the concepts described herein.

Some or all of the functions described with respect to the FPGA 224 may be performed by the processor 222, and therefore, the FPGA 224 is not required in all embodiments. Further, the FPGA 224, the memory 226, the I/O module 242, or any combination thereof may be within the same integrated circuit, such as the processor 222. In another embodiment, the control module 109 does not need to be housed within the radiation detection apparatus 102. The control module 109 may be outside the well bore. Still further, at least one component of the control module 109, as illustrated in FIG. 2 may be within the radiation detection apparatus 102 and at least one other component may be outside the radiation detection apparatus 102, such as outside the well bore. In well-logging applications, information from the devices close to the distal end of the drill string, such as the radiation detection apparatus 102, may take approximately 0.5 to approximately 5 minutes to reach the surface. The control module 109 within the radiation detection apparatus 102 can allow operations to proceed quickly without having data transmission delays.

Embodiments as described herein can allow the cause of the noise within the radiation detection apparatus to be determined. In a particular embodiment, the scintillator pad 1062, the photosensor pad 1066 can filter ultraviolet light that can be useful in determining where a spark occurred. The spark may result from excess charge building up within the radiation detection apparatus 102, as the spark may be located on the scintillator side of the scintillator pad 1062. Light from the spark, including ultraviolet light, can be captured by the scintillator 105, which in turn emits scintillating light in response to the light from the spark. The scintillator pad 1062 may include a material that filters some or all ultraviolet light. If the spark is generated on the other side of the scintillator pad 1062, the amount of ultraviolet light that reaches the scintillator 105 will be reduced, and the scintillating light output can be likewise be reduced. Thus, the output for the different locations of the spark can allow for different electronic signatures to be produced in a pulse generated at the photosensor 107. A spark within the photosensor 107 can have yet another electronic signature. Accordingly, locations or sources of sparks within the radiation detection apparatus may be determined based on the electronic pulse generated by the photosensor.

Further, embodiments as described herein can be used to monitor the health of the radiation detection apparatus. A background signal level when operating the radiation detection apparatus can be performed by the manufacturer or a user of the apparatus. The data can be collected in a manufacturing or testing facility or may be collected when the apparatus is employed in the field. For example, the information can be collected during a laboratory set-up or may be collected when the radiation detection apparatus is outdoors or within a well bore. In a particular embodiment, in a laboratory, a radiation source is placed near the radiation detection apparatus and data is collected. In another particular embodiment, the radiation detection apparatus may be placed within a well bore. Data may be collected while the system is idling, for example, when not drilling. The mud pumps and other equipment may be operating, and therefore, some vibration may be transmitted along the drill string. The portion of the drill string where the radiation detection apparatus resides may not be rotating and no significant downforce pressure may be applied to the drill bit. Alternatively, data may be collected during normal drilling operations (drill string may be rotating, downforce pressure may be applied on the bit, or both). Other configurations for collecting data may be used without departing from the scope of the concepts as described herein. When a pulse is generated at the photosensor that exceeds the background signal level, the pulse can be analyzed to identify to what the pulse corresponds and increment an appropriate counter (a gamma counter, a beta counter, a particular noise counter, or the like).

Part of monitoring the health of the radiation detection apparatus may include determining the cause of the noise within the radiation detection apparatus as previously described. The PRPM can include information regarding noise pulses from known locations, sources, or both within the radiation detection apparatus. In an embodiment, such information may be within the FPGA or the memory. In another embodiment, when the photosensor is a photomultiplier tube, noise may correspond to a position of a particular dynode shifting within the photosensor or may correspond to a spark that that is on the scintillator side of the scintillator pad. The pulse from the photosensor can be compared to pulses corresponding to the dynode's position shifting, the spark, and potentially other causes of noise within the radiation detection apparatus. When the pulse is determined to correspond to a particular cause of noise, the PRPM can record the information in the memory, send such information to a user via the I/O module, or a combination thereof.

Monitoring the health may include other aspects. Background noise may be detected at a rate when the radiation detection apparatus is first used. Over time, the amplitude or frequency of events that are identified as vibration or another noise source may increase over the life of the radiation detection apparatus. Such an increase may reflect that the radiation detection apparatus is damaged or is near the end of its useful life. For example, the position of a dynode within a photomultiplier may have shifted or become loose. Accordingly, embodiments as described herein can be used to indicate a potential problem within the radiation detection apparatus, the radiation detection apparatus is nearing the end of its useful life, or the like.

A count or count rate of pulses corresponding to vibration or another noise source, or a fraction of pulses corresponding to vibration or another noise source, may be compared to total counts or compared to counts corresponding to scintillating light generated by the scintillator in response to capturing targeted radiation (for example, gamma rays, x-rays, neutrons, or the like). In an embodiment, a threshold value for the count or count rate can be set and when the threshold value is exceeded, the event can be recorded in memory, sent to a user via the I/O module, or a combination thereof. In another embodiment, the fraction can be used instead, and the fraction can be the count or the count rate corresponding to the one or more noise sources divided by a count or count rate of a number of scintillation pulses or a total count (includes the sum of counts or count rates from scintillation and noise pulses).

In a non-limiting embodiment, soon after manufacturing or during an early field use of a radiation detection apparatus, the radiation detection apparatus may have 1 count/10 minutes corresponding to noise sources, and 500 counts/10 minutes corresponding to scintillating light from capturing targeted radiation. Later on, the radiation detection apparatus may have 4 counts/10 minutes corresponding to noise sources, and the scintillation count rate remains at 500 counts/10 minutes. Clearly, the noise count rate is increasing but is still substantially smaller than the scintillation count rate. The higher noise count rate can be used to indicate that the radiation detection apparatus likely has a problem even though the noise count rate as a fraction of the scintillation count rate or total count rate (504 counts/10 minutes) remains small.

The count, count rate, or fraction as previously described may be determined as a cumulative value for all noise sources or can be separated by location or source of noise. Thus, in an application, only noise from the photosensor may be of concern as it may indicate that the photosensor has a problem or is nearing the end of its useful life. In another application, sparks on the scintillator side of the scintillator pad may indicate that a spring or shock absorbing material may be losing its resiliency. In another application, an increase in mechanoluminescence (piezoluminescence or triboluminescence) may indicate undue deformation of the scintillator or housing. Other information can be generated as needed or desired for other applications.

Figure 7:
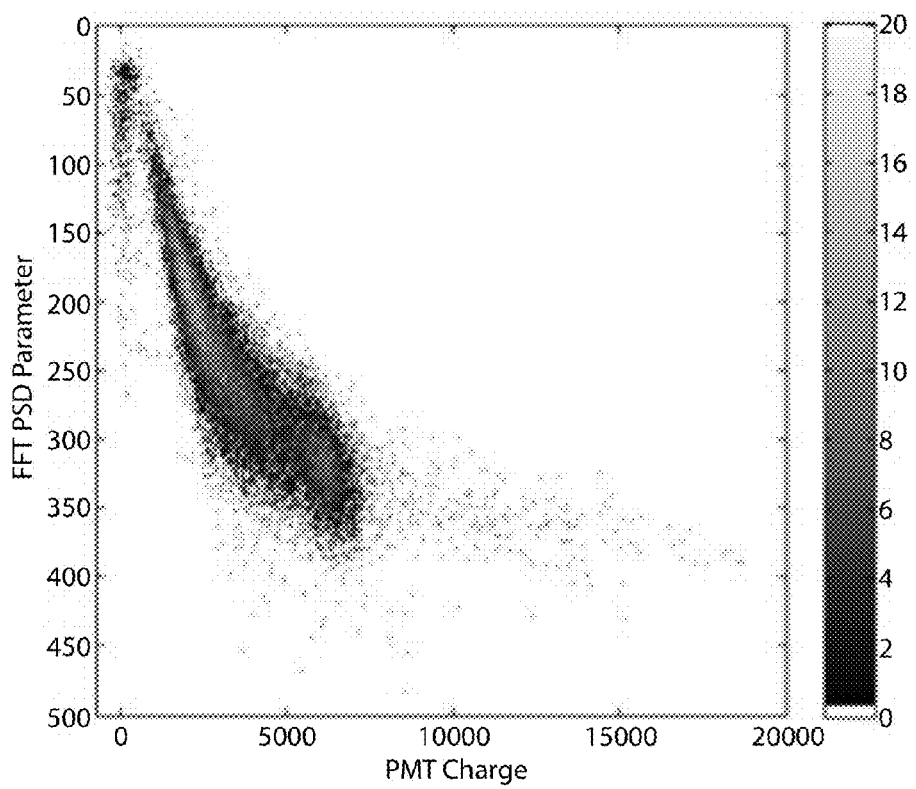
FIG. 7 includes four plots of a Fast Fourier Transform parameter vs. photomultiplier charge for a radiation detection apparatus to illustrate plots with and without a radiation source and with and without vibration, when the radiation detection apparatus is at approximately room temperature.
Figure 7:
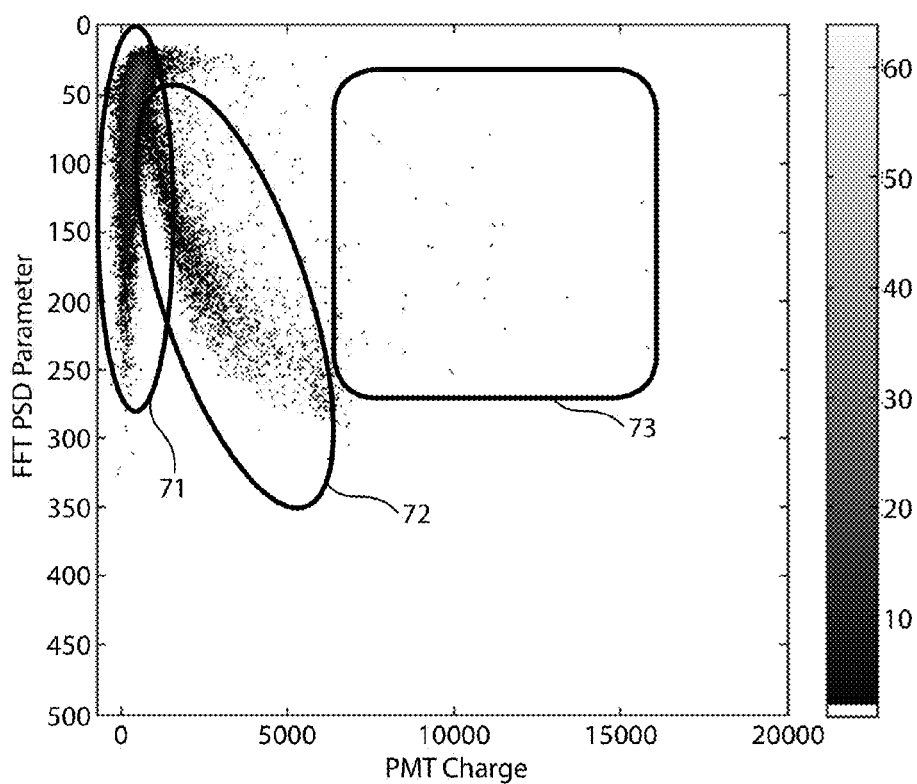

Pulse discrimination can be performed using Fast Fourier Transforms and wavelet transforms at room temperature (approximately 20° C. to approximately 25° C.). FIG. 7 includes plots of an FFT PSD parameter vs. PMT charge when the radiation detection apparatus is at approximately room temperature, the PMT is operating at approximately 1560 V, and a $^{137}$Cs radiation source is present. The left plot of FIG. 7 corresponds to FFT transformed outputs when there is no vibration, and the right plot of FIG. 7 corresponds to FFT transformed outputs when the radiation detection apparatus is vibrated at a frequency of 800 Hz. The plot for vibration at 800 Hz (right plot) has different sets of data points that can be identified as corresponding to scintillation (72) and different causes of noise (71 and 73). Thus, discriminating vibration noise from the scintillation due to radiation at a room temperature can be achieved.

Figure 8:
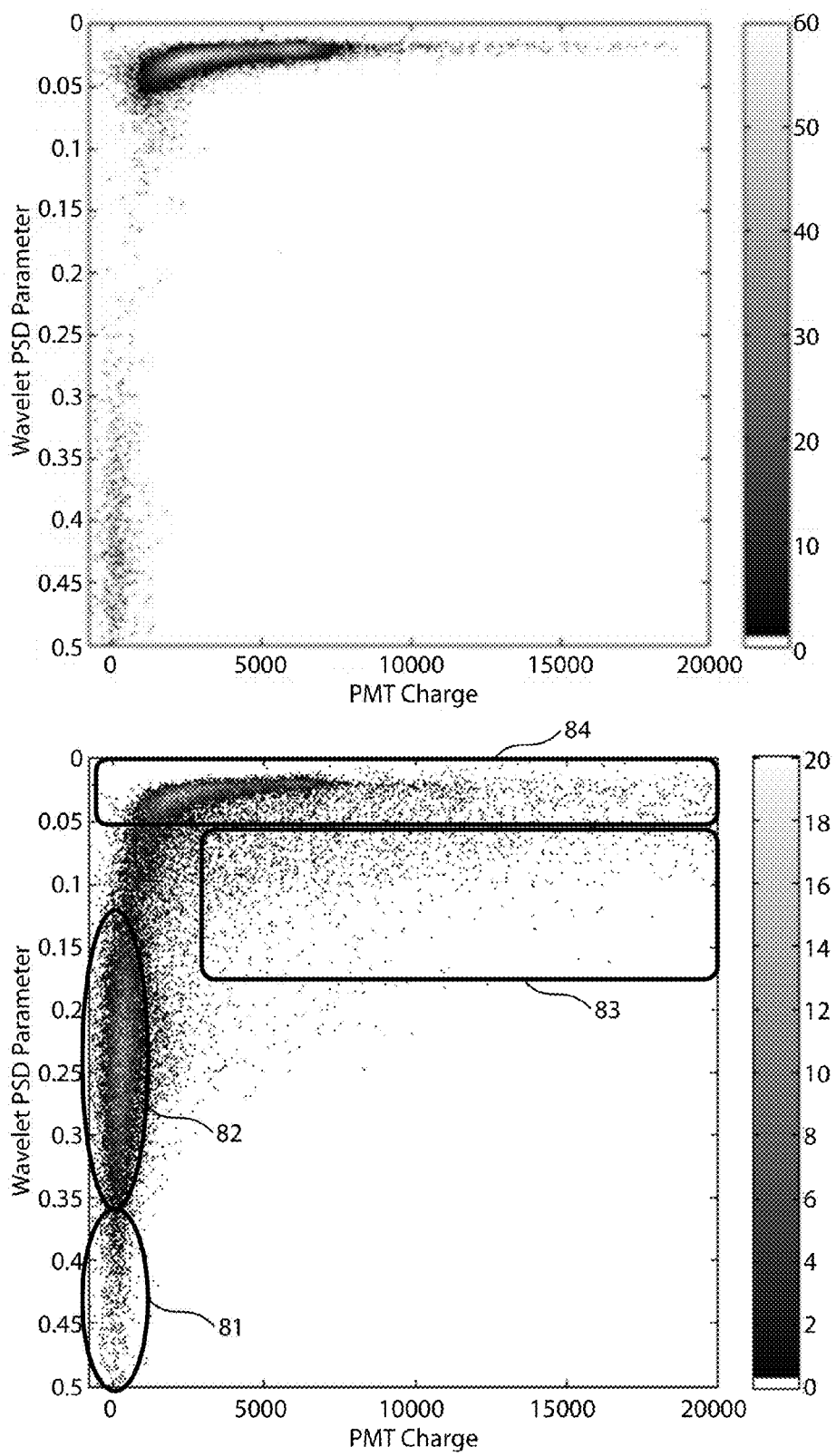
FIG. 8 includes four plots of a Wavelet Pulse Shape Discrimination parameter vs. photomultiplier charge for a radiation detection apparatus to illustrate plots with and without a radiation source present and with and without vibration, when the radiation detection apparatus is at approximately room temperature.

FIG. 8 includes plots of the Wavelet PSD parameter (previously described) vs. PMT charge when the radiation detection apparatus is at approximately room temperature, the PMT is operating at approximately 1560 V, and a $^{137}$Cs radiation source is present. The left plot of FIG. 8 corresponds to wavelet transformed outputs when there is no vibration, and the right plot of FIG. 8 corresponds to wavelet transformed outputs when the radiation detection apparatus is vibrated at a frequency of 800 Hz. The plot for a scintillation pulse with no vibration (left plot) is manifested as many data points having a relatively low Wavelet PSD parameter over a range of 0 to 10,000 for the PMT charge. The plot for the $^{137}$Cs radiation source vibration at 800 Hz (right plot) has different sets of data points that can be identified as corresponding to scintillation (84) and different causes of noise (81, 82 and 83). Thus, discriminating vibration noise from the scintillation due to radiation at a room temperature can be achieved.

Figure 9:
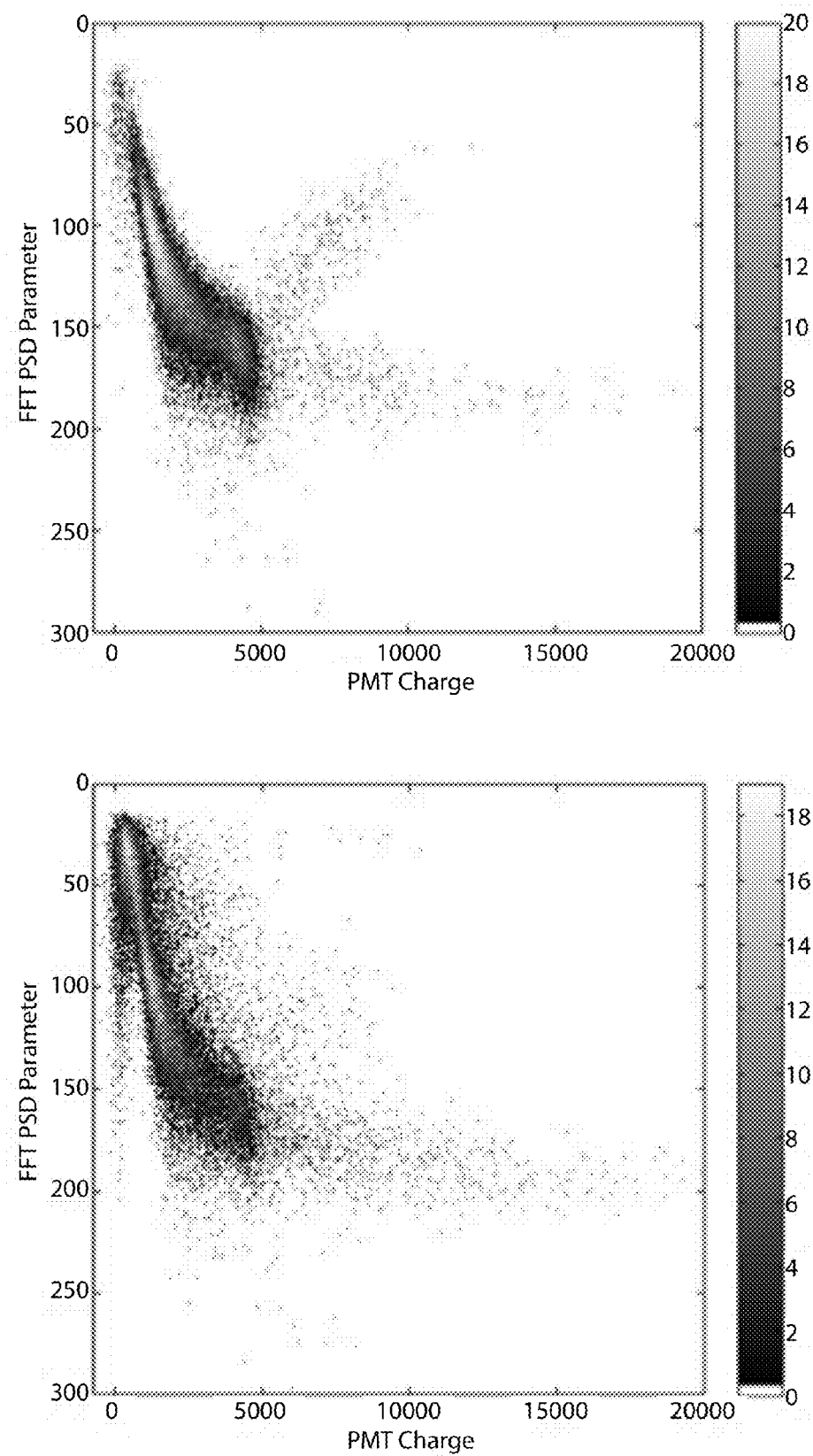
FIG. 9 includes four plots of a Fast Fourier Transform parameter vs. photomultiplier charge for a radiation detection apparatus to illustrate plots with and without a radiation source and with and without vibration, when the radiation detection apparatus is at approximately 150° C.

At a temperature significantly higher than room temperature, the difference between FFT and wavelet transforms for discrimination can be more readily seen. In particular, wavelet discrimination allows for superior identification of pulses, as compared to discrimination using FFT, particularly when the radiation detection apparatus is under vibration. FIG. 9 includes plots of an FFT parameter vs. PMT charge when the radiation detection apparatus is at approximately 150° C., the PMT is operating at approximately 1560 V, and a $^{137}$Cs radiation source is present. The left plot of FIG. 9 corresponds to FFT transformed outputs when there is no vibration, and the right plot of FIG. 9 corresponds to FFT transformed outputs when the radiation detection apparatus is vibrated at a frequency of 800 Hz. The data points corresponding to noises and the data points corresponding to scintillation are hardly distinguishable, as seen with the plot when the apparatus is vibrated at 800 Hz (right plot). Thus, discriminating vibration noise from the scintillation due to radiation at a temperature significantly higher than room temperature with a high level of confidence is very difficult.

Figure 10:
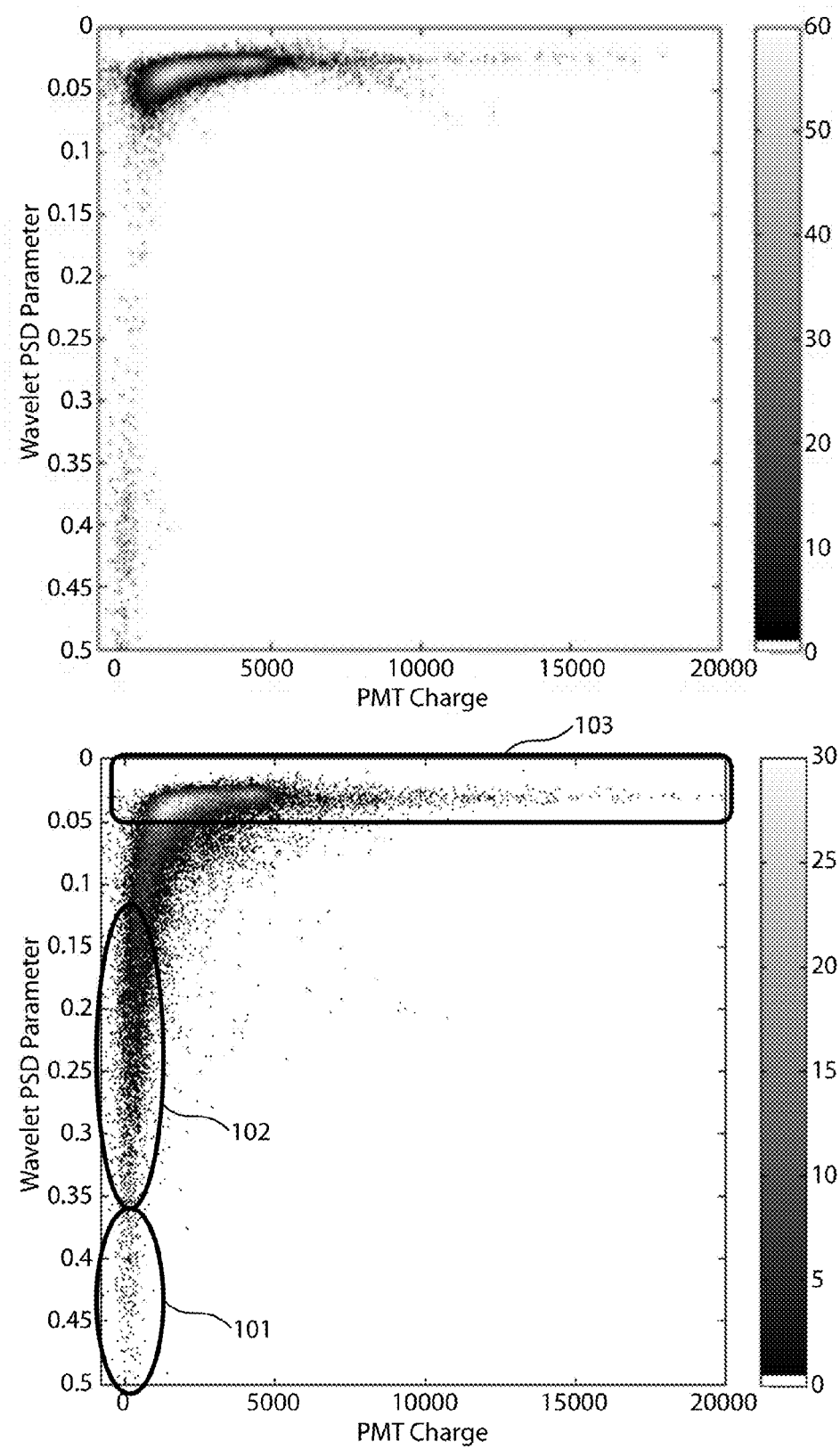
FIG. 10 includes four plots of a Wavelet Pulse Shape Discrimination parameter vs. photomultiplier charge for a radiation detection apparatus to illustrate plots with and without a radiation source present and with and without vibration, when the radiation detection apparatus is at approximately 150° C.

FIG. 10 includes plots of the Wavelet PSD parameter (previously described) vs. PMT charge when the radiation detection apparatus is at approximately 150° C., the PMT is operating at approximately 1560 V, and a $^{137}$Cs radiation source is present. The left plot of FIG. 10 corresponds to wavelet transformed outputs when there is no vibration, and the right plot of FIG. 10 corresponds to wavelet transformed outputs when the radiation detection apparatus is vibrated at a frequency of 800 Hz. The plot for a scintillation pulse with no vibration (left plot) is manifested as many points having a relatively low Wavelet PSD parameter over a range of 0 to 10,000 for the PMT charge. On the plot for vibration at 800 Hz (right plot), the data points corresponding to noises (101 and 102) and the data points corresponding to scintillation (103) are clearly distinguishable. Thus, unlike FFT discrimination, for wavelet discrimination, discriminating a noise pulse from the scintillation pulse at a temperature significantly higher than room temperature with a high level of confidence can be achieved.

In summary, pulse discrimination can be performed using more than one type of transform at one set of conditions, but at another set of conditions, one type of transform may allow for pulse discrimination at a higher level of confidence than a different type of transform. At higher temperatures, the ability to use wavelet discrimination allows for classification (scintillation pulse or noise pulse) and identification of types of radiation or radiation sources and causes of noise to be made with higher confidence. The techniques are robust to be useful over a range of temperatures, particular those that occur within wellbores during drilling operations. At a different set of conditions, such as a different scintillator composition, FFT may allow for pulse discrimination at a higher level of confidence than wavelet transforms. At still another set of conditions, a transform different from FFT and wavelet transforms may perform better than FFT or wavelet transforms.

Pulse discrimination using transforms can allow a pulse to be classified as a scintillation pulse or a noise pulse, and, for scintillation pulses, identify a type of radiation or radiation source, and, for noise pulses, identify a cause of the noise. Further, the pulse does not need to be de-noised to analyze the pulse. Thus, analysis of a pulse to identify a type of radiation or radiation source can be performed even when noise, such as vibration, is present within the pulse. The causes can be used to predict failure modes, failure rates, or life expectancy regarding radiation detection apparatuses. Such information can be useful to allow a radiation detection apparatus that has had a relatively high noise count rate to be replaced before using the sonde is deployed in a new wellbore. Further, the information obtained from the noise analysis can be useful in designing future generations of radiation detection apparatuses to withstand particular environments, such as within a wellbore or outdoors for a port-of-entry radiation detection apparatus.

Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa. Embodiments may be in accordance with any one or more of the items as listed below.

Item 1. A radiation detection apparatus comprising a scintillator, a photosensor optically coupled to the scintillator, and a control module electrically coupled to the photosensor. The control module is configured to receive a pulse from the photosensor and identify a cause of a noise corresponding to the pulse.

Item 2. The radiation detection apparatus of Item 1, wherein the control module is further configured to determine whether or not the pulse corresponds to a noise pulse.

Item 3. A radiation detection apparatus comprising a scintillator, a photosensor optically coupled to the scintillator, and a control module electrically coupled to the photosensor. The control module is configured to receive a pulse from the photosensor and determine whether the pulse corresponds to a scintillation pulse or a noise pulse, wherein the control module is configured to perform the determination without de-noising the pulse.

Item 4. The radiation detection apparatus of Item 3, wherein the control module is further configured to identify a cause of a noise corresponding to the pulse.

Item 5. The radiation detection apparatus of any one of the preceding Items, wherein the control module is further configured to identify a type of radiation or a radiation source corresponding to the pulse, wherein the control module is configured to perform the identification without de-noising the pulse.

Item 6. The radiation detection apparatus of any one of the preceding Items, wherein the control module is further configured to compare the pulse to known pulses.

Item 7. The radiation detection apparatus of Item 6, wherein the control module is further configured to obtain state information, wherein the known pulses include pulses that correspond to the state information.

Item 8. The radiation detection apparatus of Item 6 or 7, wherein the known pulses includes a temperature-adjusted pulse for a known cause of a noise.

Item 9. The radiation detection apparatus of any one of the preceding Items, wherein the control module is further configured to generate derivative information from the pulse that can be used to determine whether the pulse is a scintillation pulse or a noise pulse, identify a type of radiation or a radiation source corresponding to the pulse, identify a source of noise corresponding to the pulse, or any combination thereof.

Item 10. The radiation detection apparatus of Item 9, wherein the derivative information includes a transform-based parameter.

Item 11. The radiation detection apparatus of Item 10, wherein the derivative information includes a wavelet transform.

Item 12. The radiation detection apparatus of Item 11, wherein the wavelet discrimination is capable of being performed using a mother wavelet that is a Morlet wavelet.

Item 13. The radiation detection apparatus of Item 11, wherein the wavelet discrimination is capable of being performed using a mother wavelet that is a Haar wavelet, a Meyer wavelet, a Mexican hat wavelet, a Daubechies wavelet, a Coiflet wavelet, a Symlet wavelet, a Paul wavelet, a Difference of Gaussians wavelet, or a customized wavelet.

Item 14. The radiation detection apparatus of Item 10, wherein the derivative information includes a Fast Fourier Transform or a Discrete Cosine Transform.

Item 15. The radiation detection apparatus of Item 9, wherein the derivative information includes a rise time, a slope of intensity vs. time during rise, area under the curve during rise as measured as an integration of intensity over a time period, a decay time, a slope of intensity vs. time during decay, area under the curve during decay as measured as an integration of intensity over a time period, a ratio of the rise time to the decay time, or any derivative thereof.

Item 16. The radiation detection apparatus of any one of the preceding Items, wherein the control module is further configured to monitor a health of the radiation detection apparatus.

Item 17. The radiation detection apparatus of Item 16, wherein monitor the health of the radiation detection apparatus comprises determine when a count of a number of noise pulses or a noise pulse rate exceeds a threshold value.

Item 18. The radiation detection apparatus of Item 16, wherein monitor the health of the radiation detection apparatus comprises determine when a fraction exceeds a threshold value, wherein the fraction is a first count of a number of noise pulses divided by a second count of a number of pulses corresponding to targeted radiation being captured by the scintillator or a total count; or a first count rate of noise pulses divided by a second count rate of pulses corresponding to targeted radiation being captured by the scintillator or a total count rate.

Item 19. A method of using a radiation detection apparatus comprising providing the radiation detection apparatus comprising a scintillator optically coupled to a photosensor that is electrically coupled to a control module, receiving a pulse from the photosensor, and identifying a cause of noise corresponding to the pulse.

Item 20. The method of Item 19, further comprising determining whether or not the pulse corresponds to a noise pulse.

Item 21. A method of using a radiation detection apparatus comprising providing the radiation detection apparatus comprising a scintillator optically coupled to a photosensor that is electrically coupled to a control module, receiving a pulse from the photosensor, and determining whether the pulse corresponds to a scintillation pulse or a noise pulse, wherein the determination is performed without de-noising the pulse.

Item 22. The method of Item 21, further comprising identifying a cause of a noise corresponding to the pulse.

Item 23. The method of any one of Items 19 to 22, further comprising identifying a type of radiation or a radiation source corresponding to the scintillation pulse wherein the identification is performed without de-noising the pulse.

Item 24. The method of any one of Items 19 to 21, further comprising comparing the pulse to known pulses.

Item 25. The method of Item 24, further comprising obtaining state information, wherein the known pulses include pulses that correspond to the state information.

Item 26. The method of Item 24 or 25, further comprising comparing the pulse to a temperature-adjusted pulse for a known cause of a noise.

Item 27. The method of any one of Items 19 to 26, wherein further comprising generating derivative information from the pulse that can be used to determine whether the pulse is a scintillation pulse or a noise pulse, identify a type of radiation or a radiation source corresponding to the pulse, identify a source of noise corresponding to the pulse, or any combination thereof.

Item 28. The method of Item 27, wherein the derivative information includes a transform-based parameter.

Item 29. The method of Item 28, wherein the derivative information includes a wavelet transform.

Item 30. The method of Item 29, wherein the wavelet discrimination is capable of being performed using a mother wavelet that is a Morlet wavelet.

Item 31. The method of Item 29, wherein the wavelet discrimination is capable of being performed using a mother wavelet that a Haar wavelet, a Meyer wavelet, a Mexican hat wavelet, a Daubechies wavelet, a Coiflet wavelet, a Symlet wavelet, a Paul wavelet, a Difference of Gaussians wavelet, or a customized wavelet.

Item 32. The method of Item 28, wherein the derivative information includes a Fast Fourier Transform or a Discrete Cosine Transform.

Item 33. The method of Item 27, wherein the derivative information includes a rise time, a slope of intensity vs. time during rise, area under the curve during rise as measured as an integration of intensity over a time period, a decay time, a slope of intensity vs. time during decay, area under the curve during decay as measured as an integration of intensity over a time period, a ratio of the rise time to the decay time, or any derivative thereof.

Item 34. The method of any one of Items 19 to 33, further comprising monitoring a health of the radiation detection apparatus.

Item 35. The method of Item 34, wherein monitoring the health of the radiation detection apparatus comprises determining when a count of a number of noise pulses or a noise pulse rate exceeds a threshold value.

Item 36. The method of Item 34, wherein monitoring the health of the radiation detection apparatus comprises determining when a fraction exceeds a threshold value, wherein the fraction is a first count of a number of noise pulses divided by a second count of a number of pulses corresponding to targeted radiation being captured by the scintillator or a total count; or a first count rate of noise pulses divided by a second count rate of pulses corresponding to targeted radiation being captured by the scintillator or a total count rate.

Item 37. The radiation detection apparatus or the method of any one of the preceding Items, further comprising a high fidelity amplifier, wherein an input of the high fidelity amplifier is coupled to an output of the photosensor, and an output of the high fidelity amplifier is coupled to an input of the control module.

Item 38. The radiation detection apparatus or the method of any one of the preceding Items, further comprising an analog-to digital converter to convert the pulse from the photosensor to a digital signal.

Item 39. The radiation detection apparatus or the method of Item 38, wherein the radiation detection apparatus is configured such that the pulse as originally generated by the photosensor is directly received by the analog-to-digital converter.

Item 40. The radiation detection apparatus or the method of any one of the preceding Items, wherein the radiation detection apparatus is configured such that the pulse as generated by the photosensor is an analog signal that is not amplified before wavelet discrimination.

Item 41. The radiation detection apparatus or the method of any one of the preceding Items, wherein the control module further comprises a field programmable gate array.

Item 42. The radiation detection apparatus or the method of any one of the preceding Items, wherein the scintillator, the photosensor, and the control module are parts of a measurement-while-drilling device.

Item 43. The radiation detection apparatus or the method of any one of the preceding Items, further comprising an optical coupling material disposed between the scintillator and the photosensor.

Item 44. The radiation detection apparatus or the method of Item 43, wherein the optical coupling material is capable of filtering an ultraviolet radiation.

EXAMPLES

The concepts described herein will be further described in the Examples, which do not limit the scope of the invention described in the claims. The Examples demonstrate that wavelet discrimination can be used at least in part to determine whether a pulse is a scintillation pulse or a noise pulse. The data can be correlated to information within memory or a database to identify a potential source or cause of the scintillation or noise pulse.

Figure 11:
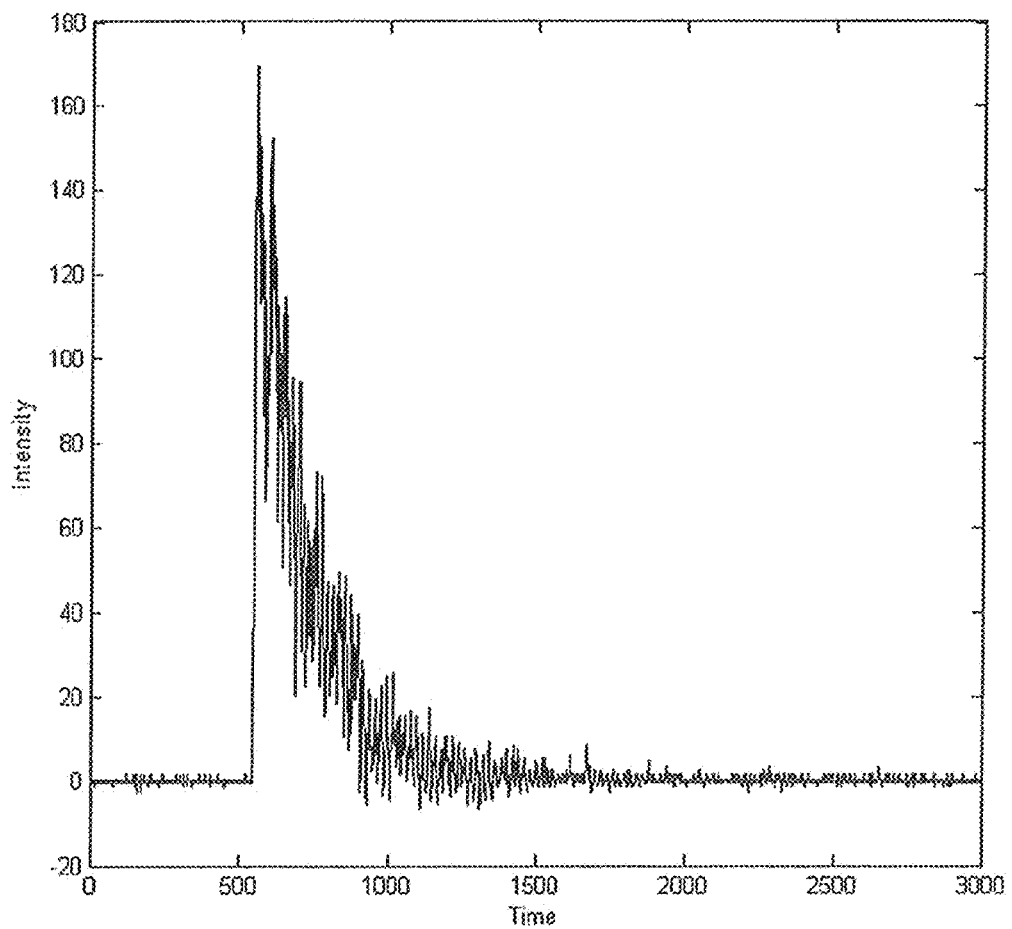
FIGS. 11 to 15 include intensity vs. time plots for different types of pulses as generated by a photosensor.
Figure 12:
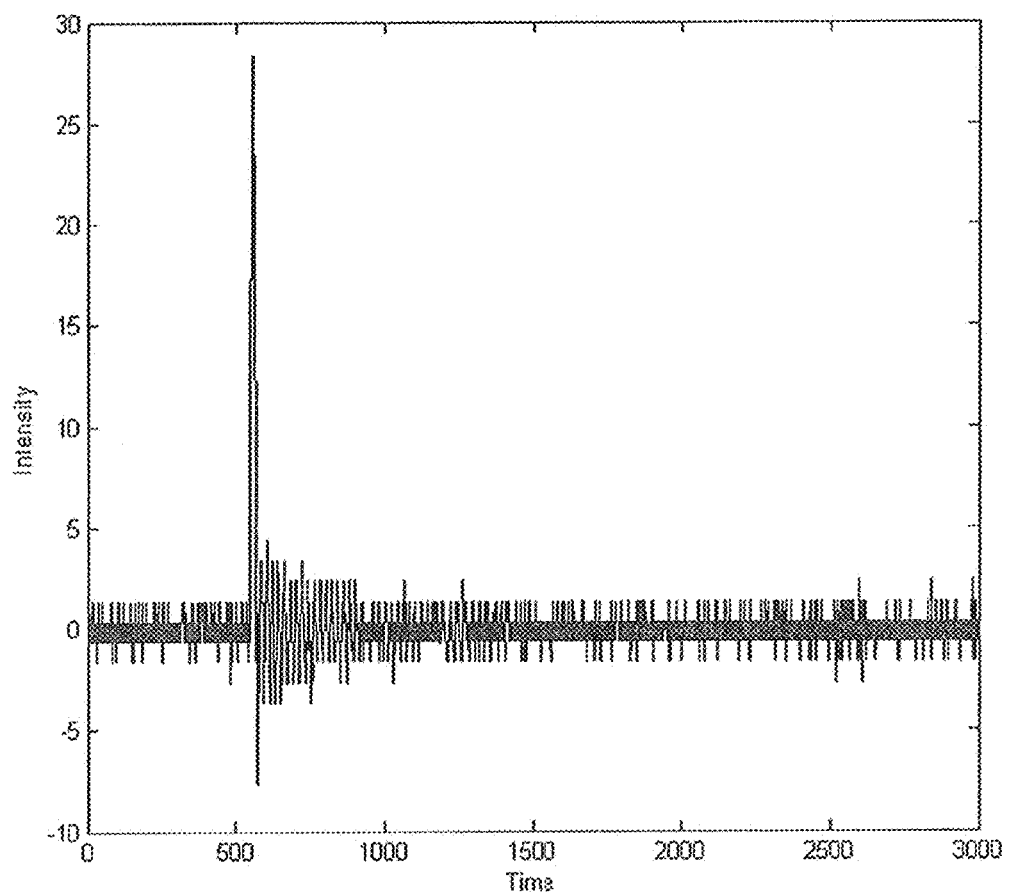
Figure 13:
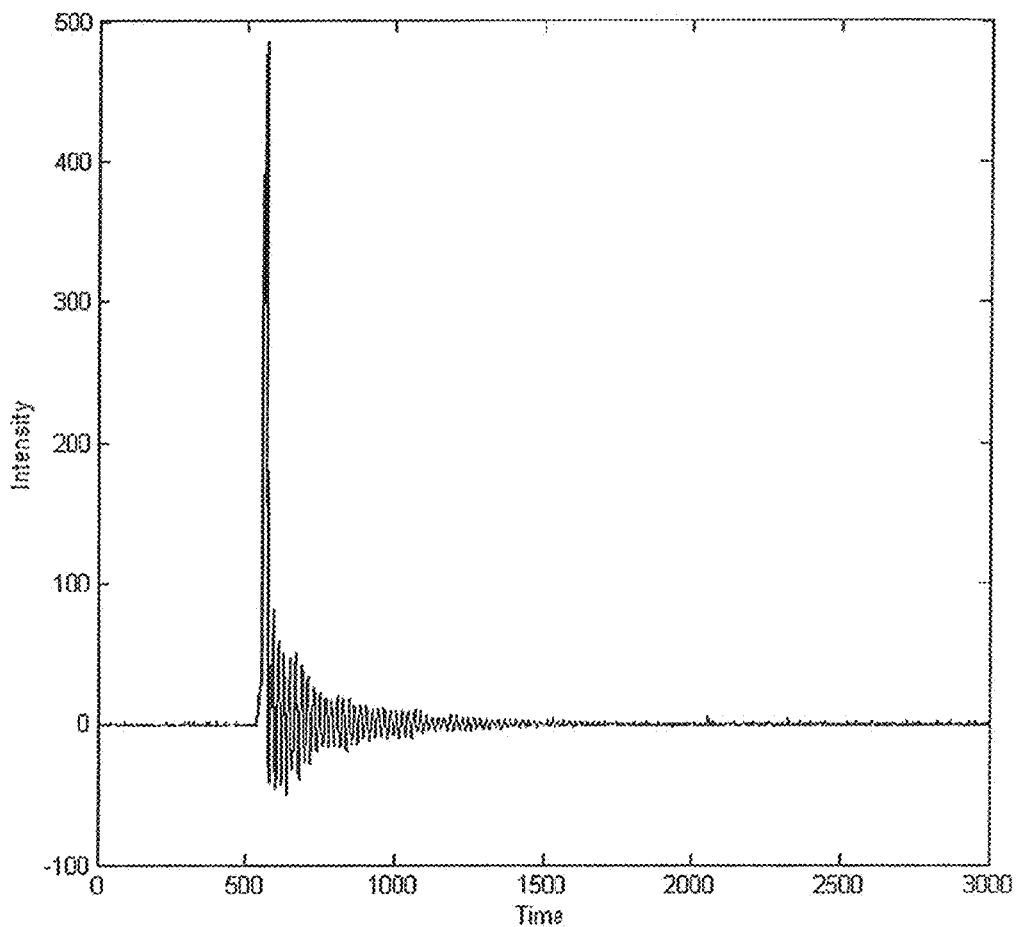
Figure 14:
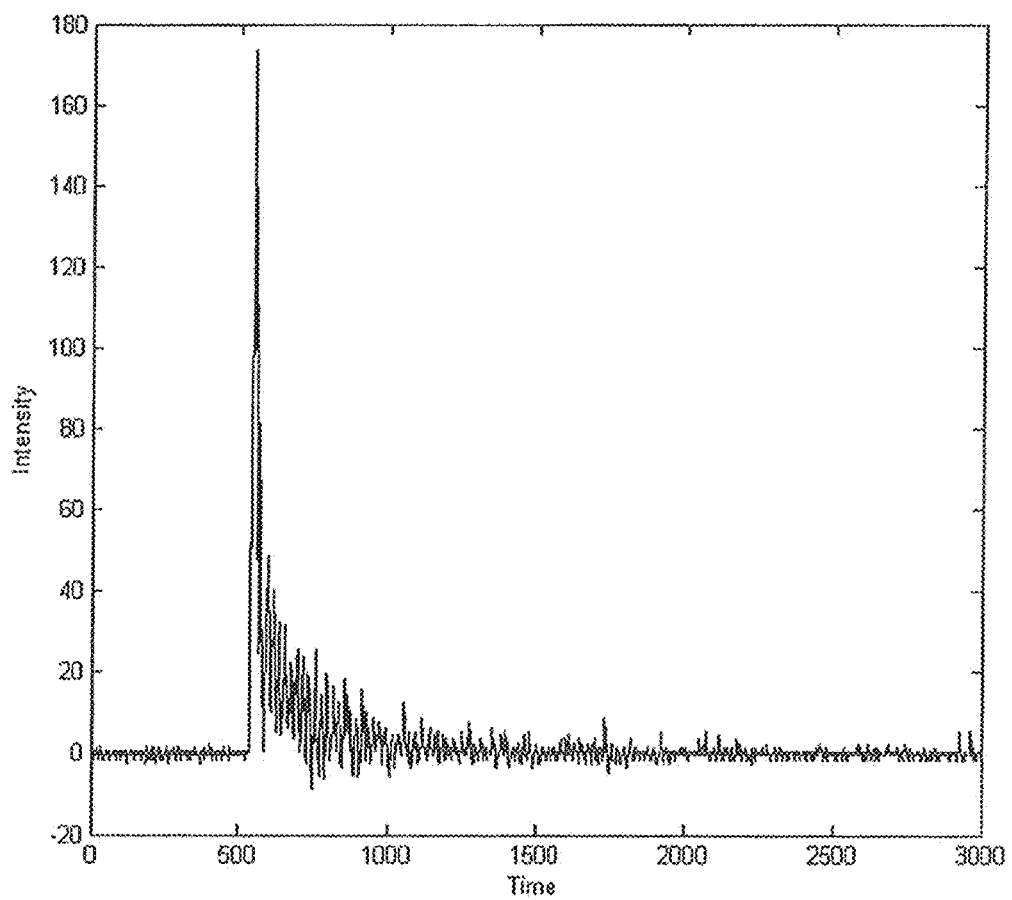
Figure 15:
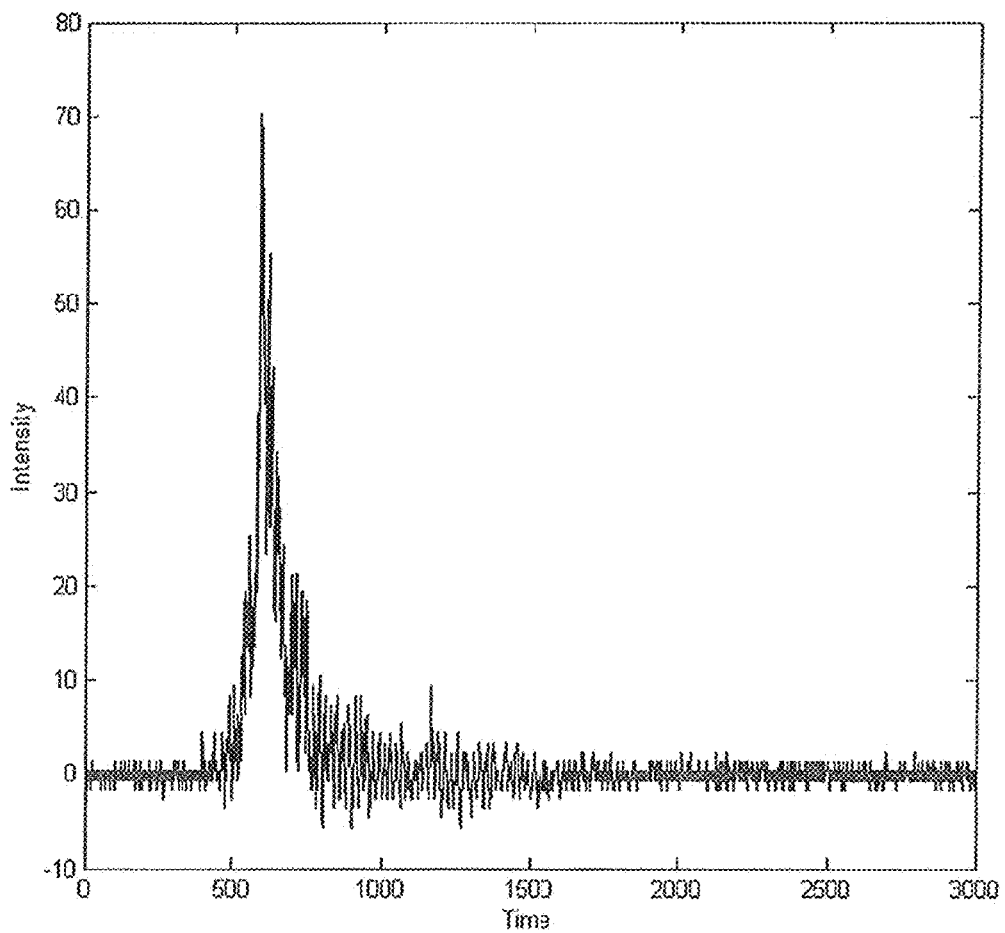

FIGS. 11 to 15 include pulse plots of intensity vs. time for pulses generated by a photosensor coupled to a NaI scintillation detector. FIG. 11 can be obtained when the radiation detection apparatus is exposed to radiation from a radiation source with or without vibration present. FIG. 12 can be obtained from the radiation detection apparatus when a PMT dark pulse occurs during vibration without a radiation source present. PMT dark noise is noise from the PMT. The photocathode of the PMT can spontaneously emit photoelectrons just from thermal fluctuations for many different temperatures. FIG. 13 can be obtained from the radiation detection apparatus when an electrostatic discharge ("ESD") or mechanoluminescence occurs during vibration without a radiation source present. ESD noise is the sparking from the optical coupling pads that can arise from relative movement between the scintillator and the pad or between the PMT and the pad. Mechanoluminescence is scintillation light that arises from the scintillator being compressed or deformed during a shock. FIG. 14 can be obtained when the radiation detection apparatus is under vibration with or without radiation source present. FIG. 15 can be obtained when the radiation detection apparatus when an unknown problem occurs with the radiation detection apparatus.

TABLE 1

Wavelet PSD Parameter

| Pulse Plot | Possible Mechanism | Count Rate 800 Hz RT | Count Rate 800 Hz 150° C. | Wavelet PSD Parameter |
| --- | --- | --- | --- | --- |
| FIG. 11 | Scintillation | Radiation source dependent | Radiation source dependent | 0.03~0.05 |
| FIG. 12 | PMT dark pulse | Low | Low | 0.4~0.45 |
| FIG. 13 | ESD or mechanoluminescence | High | Reduced | 0.15~0.35 |
| FIG. 14 | Other vibration-induced pulse | High | Significantly Reduced | 0.05~0.25 |
| FIG. 15 | Unknown | Rare | Rare | 0.01~0.02 |

The plots as illustrated in FIGS. 11 to 15 do not by themselves provide sufficient information to determine whether or not a pulse is a scintillation pulse or a noise pulse, if such pulse can be identified as a scintillation pulse, identifying the type of radiation or radiation source, and if such pulse can be identified as a noise pulse, identifying a cause of the noise. By using the Wavelet PSD parameter, the possible mechanism can be determined. Even with the radiation detection apparatus is at a temperature significantly above room temperature, such as 150° C., the analysis can be performed with relatively high confidence.

Referring to Table 1, NaI scintillation excited by a radiation source can be determined by a Wavelet PSD parameter of approximately 0.03 to approximately 0.05. A relatively higher Wavelet PSD parameter (approximately 0.15 to approximately 0.35) corresponds to ESD or mechanoluminescence, and an even higher Wavelet PSD parameter (from approximately 0.4 to approximately 0.45) corresponds to a PMT dark pulse. The Wavelet PSD parameter for another type of vibration induced pulses is in a range of approximately 0.05 to approximately 0.05 to 0.25. The count rate from this type of vibration induced pulses is significantly reduced when the temperature increases from approximately room temperature to approximately 150° C. To the extent the ranges of the Wavelet PSD parameters for different causes of noise overlap, such as with ESD or mechanoluminescence and other vibration-induced pulse, another parameter can be used to differentiate between such causes of noise. In an embodiment, pulse height discrimination based on pulse height may be used. In another embodiment, a different parameter may be used. The ability to use wavelet discrimination allows for classification (scintillation pulse or noise pulses) and identification of radiation sources and causes of noise to be made with higher confidence.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A radiation detection apparatus comprising:
   a scintillator;
   a photosensor optically coupled to the scintillator; and
   a control module electrically coupled to the photosensor, wherein the control module is configured to:
     analyze state information associated with the radiation detection apparatus;
     receive a pulse from the photosensor;
     generate a wavelet transformed pulse from the received pulse;
     determine from the state information and the wavelet transformed pulse whether or not the received pulse corresponds to a noise pulse; and further analyze the wavelet transformed pulse to identify a cause of a noise, a type of a radiation, or a radiation source corresponding to the received pulse,
   wherein the control module is adapted to identify a cause of the noise at a temperature of at least 100° C.

2. The radiation detection apparatus of claim 1, wherein the control module is further configured to identify a type of radiation or a radiation source corresponding to a scintillation pulse, wherein the control module is configured to perform the identification without de-noising the pulse.

3. The radiation detection apparatus of claim 1, wherein the control module is further configured to:
   compare the pulse to known pulses, wherein the known pulses include pulses that correspond to the state information.

4. The radiation detection apparatus of claim 1, wherein the control module is further configured to generate derivative information from the pulse that can be used to determine whether the pulse is a scintillation pulse or a noise pulse, identify a type of radiation or a radiation source corresponding to the pulse, identify a source of noise corresponding to the pulse, or any combination thereof.

5. The radiation detection apparatus of claim 4, wherein the derivative information includes a transform-based parameter.

6. The radiation detection apparatus of claim 5, wherein the derivative information includes a wavelet transform.

7. The radiation detection apparatus of claim 6, wherein the wavelet discrimination is capable of being performed using a mother wavelet that is a Morlet wavelet.

8. The radiation detection apparatus of claim 6, wherein the wavelet discrimination is capable of being performed using a mother wavelet that is a Haar wavelet, a Meyer wavelet, a Mexican hat wavelet, a Daubechies wavelet, a Coiflet wavelet, a Symlet wavelet, a Paul wavelet, a Difference of Gaussians wavelet, or a customized wavelet.

9. The radiation detection apparatus of claim 5, wherein the derivative information includes a Fast Fourier Transform, or a Discrete Cosine Transform.

10. The radiation detection apparatus of claim 1, wherein the control module is further configured to monitor a health of the radiation detection apparatus.

11. The radiation detection apparatus of claim 10, wherein monitor the health of the radiation detection apparatus comprises determine when a count of a number of noise pulses or a noise pulse rate exceeds a threshold value.

12. The radiation detection apparatus of claim 10, wherein monitor the health of the radiation detection apparatus comprises determine when a fraction exceeds a threshold value, wherein the fraction is:

a first count of a number of noise pulses divided by a second count of a number of pulses corresponding to targeted radiation being captured by the scintillator or a total count; or a first count rate of noise pulses divided by a second count rate of pulses corresponding to targeted radiation being captured by the scintillator or a total count rate.

13. The radiation detection apparatus of claim 1, wherein the scintillator, the photosensor, and the control module are parts of a measurement-while-drilling device.

14. The radiation detection apparatus of claim 1, further comprising a memory, wherein, after identifying the cause of the noise, information corresponding to the cause of the noise is stored in the memory.

15. The radiation detection apparatus of claim 1, wherein the state information includes a temperature of the photosensor or the scintillator when the pulse is received.

16. A radiation detection apparatus comprising:
a scintillator;
a photosensor optically coupled to the scintillator; and
a control module electrically coupled to the photosensor, wherein the control module is configured to:
   receive a pulse from the photosensor; and
   determine whether the pulse corresponds to a scintillation pulse or a noise pulse using a wavelet transform at a temperature of at least 100° C., wherein the control module is configured to perform the determination without de-noising the pulse.

17. A radiation detection apparatus comprising:
a scintillator;
a photosensor optically coupled to the scintillator; and
a control module electrically coupled to the photosensor, wherein the control module is configured to:
   receive a pulse from the photosensor;
   identify a cause of a noise corresponding to the pulse; and
   monitor a health of the radiation detection apparatus based on a count of a number of noise pulses or a count rate of noise pulses.

18. The radiation detection apparatus of claim 17, wherein monitor the health of the radiation detection apparatus comprises determine when a count of a number of noise pulses or a noise pulse rate exceeds a threshold value.

19. The radiation detection apparatus of claim 17, wherein monitor the health of the radiation detection apparatus comprises determine when a fraction exceeds a threshold value, wherein the fraction is:

a first count of a number of noise pulses divided by a second count of a number of pulses corresponding to targeted radiation being captured by the scintillator or a total count; or a first count rate of noise pulses divided by a second count rate of pulses corresponding to targeted radiation being captured by the scintillator or a total count rate.

* * * * *